United States Patent
Kirk et al.

(10) Patent No.: US 7,447,403 B2
(45) Date of Patent: Nov. 4, 2008

(54) INTEGRATED ETCHED MULTILAYER GRATING BASED WAVELENGTH DEMULTIPLEXER

(75) Inventors: Andrew G Kirk, Outremont (CA); Eric Bisaillon, Montreal (CA)

(73) Assignee: McGill University, Montreal, Quebec (CA)

( * ) Notice: Subject to any disclaimer, the term of this patent is extended or adjusted under 35 U.S.C. 154(b) by 0 days.

(21) Appl. No.: 11/583,001

(22) Filed: Oct. 19, 2006

(65) Prior Publication Data

US 2007/0086703 A1    Apr. 19, 2007

Related U.S. Application Data

(60) Provisional application No. 60/727,879, filed on Oct. 19, 2005.

(51) Int. Cl.
G02B 6/34 (2006.01)
(52) U.S. Cl. ............................... 385/37; 385/15; 385/31
(58) Field of Classification Search ................... 385/15, 385/31, 37
See application file for complete search history.

(56) References Cited

U.S. PATENT DOCUMENTS

| | | | |
|---|---|---|---|
| 5,002,350 | A | 3/1991 | Dragone |
| 5,136,671 | A | 8/1992 | Dragone |
| 5,581,639 | A | 12/1996 | Davies et al. |
| 5,937,113 | A | 8/1999 | He et al. |
| 6,483,964 | B1 | 11/2002 | Beguin et al. |
| 6,519,380 | B2 | 2/2003 | Dawes et al. |
| 6,553,160 | B2 | 4/2003 | Cao |
| 6,563,977 | B1 | 5/2003 | Chen et al. |
| 6,657,723 | B2 | 12/2003 | Cohen et al. |
| 6,728,442 | B2 | 4/2004 | Missey et al. |
| 6,735,362 | B1 | 5/2004 | Soskind |
| 6,850,670 | B2 | 2/2005 | Parhami et al. |
| 2006/0082751 | A1* | 4/2006 | Moors et al. .......... 355/69 |

FOREIGN PATENT DOCUMENTS

WO    WO 99/34539 A1    7/1999
WO    WO 99/60433 A1    11/1999

OTHER PUBLICATIONS

V. Tolstikhin et al "Monolithically Integrated Optical Channel Monitor for DWDM Transmission Systems" *Journal of Lightwave Technology*, vol. 22, No. 1, pp. 146-153, 2004.

* cited by examiner

*Primary Examiner*—Jennifer Doan
(74) *Attorney, Agent, or Firm*—Freedman & Associates; Mark Robert Weir

(57) ABSTRACT

An integrated etched multilayer grating-based wavelength multiplexer/demultiplexer is disclosed wherein an etched multilayer grating structure is monolithically integrated within the optical waveguide stack of the multiplexer/demultiplexer to reflectively diffract an input optical beam. The multilayer grating structure is generally comprised of a series of etched diffractive elements and an etched multilayer reflector, the combined optical response of which providing the desired multiplexing/demultiplexing effect. The etched structures are generally comprised of shallow etch structures in a top surface of the multiplexer/demultiplexer waveguide stack. Monolithically integrated input and output ridge waveguides may also be provided, optionally fabricated in a same etching step as the etched multilayer grating.

68 Claims, 13 Drawing Sheets

INTEGRATED ETCHED MULTILAYER GRATING BASED WAVELENGTH DEMULTIPLEXER

This application claims priority from U.S. Patent Application No. 60/727,879 filed Oct. 19, 2005, the entire contents of which are incorporated herein by reference.

FIELD OF THE INVENTION

The invention relates to integrated optical wavelength multiplexer and de-multiplexers and, more particularly to providing integrated etched multilayer grating structures for wavelength dispersive elements.

BACKGROUND OF THE INVENTION

Driven by bandwidth hungry applications, optical broadband access networks have advanced very rapidly in recent years, becoming the core of new triple-play telecommunication services, which deliver data, video and voice on the same optical fiber right to the user. Deep penetration of the optical fiber into the access networks is accompanied with massive deployment of the optical gear that drives data traffic along the fiber links. The result is that wavelength division multiplexed optical networks which receive downstream and send upstream data signals using multiple optical signals on a single optical fiber are now being deployed at every optical line terminal or/and network user interface rather than their historical deployments within the long-haul network and infrastructure backbone networks.

Such deployments range from the provisioning of only two or three wavelengths, in the case of Fiber-to-the-Home, albeit with volumes of millions of units as one is required for every subscribers home, through to those provisioning typically 4, 8, or 12 wavelengths in the local loop and router feed networks, to those providing 16, 20, 32, 40 and more wavelengths in the metropolitan area networks and long-haul networks.

Further, the carrier roadmaps of initially provisioning broadband optical access, e.g. Broadband Passive Optical Network (BPON), with subscriber downstream/upstream at 10 Mb/s to 100 Mb/s, evolving through Ethernet based access, e.g. Ethernet Passive Optical Network (EPON), and on to Gigabit Passive Optical Network (GPON) wherein 2.5 Gb/s is provided downstream per subscriber and upstream supports 1.2 Gb/s transmission. Competing roadmaps from national carriers outside the United States such as Japan and Korea are developing Wavelength Division Multiplexed Passive Optical Network (WDM-PON), wherein each subscriber has a discrete wavelength provisioned to them supporting potentially bidirectional 2.4 Gb/s transmission. Such roadmaps very quickly limit even the capacity of today's largest 80 channel 10 Gb/s communications backbone networks. At maximum streaming with GPON such a link potentially only supports 320 subscribers!

Therefore, cost efficiency and volume scalability in manufacturing of the components within such wavelength division multiplexed networks (WDM) are increasingly becoming the major requirements for their mass production. Further, where photonic integrated circuits (PICs), also referred to a integrated optical components or circuits, is considered for the provisioning of the functional elements there is considerable benefit from providing the optical elements within a design environment that supports the integration of potentially optical and electrical circuits within a single integrated circuit.

Hence PICs, in which different functionalities are monolithically integrated onto one photonic chip, are an attractive technology and component solution in that they enable the production of complex optical circuits using high volume semiconductor wafer fabrication techniques. This provides the ability to dramatically reduce the component footprint, avoid multiple packaging issues, eliminate multiple optical alignments and, eventually, achieve the unprecedented cost efficiency and volume scalability in mass production of consumer photonics products.

In the context of applications, the advantages of PIC technology become especially compelling when active waveguide devices, such as lasers and/or photodetectors, are combined with the passive waveguide devices and the elements of the waveguide circuitry, to form a highly functional photonic system on the chip with minimal, preferably just one, optical input and/or output port. Since the active devices, which emit, detect or intentionally alter (e.g. modulate) optical signals by electrical means, usually all are made from artificially grown semiconductors having bandgap structures adjusted to the function and wavelength range of their particular application, such semiconductors are the natural choice for the base material of the PICs. For example, indium phosphide (InP) and related III-V semiconductors are the common material system for the PICs used in optical fiber communications, since they uniquely allow the active and passive devices operating in the spectral ranges of interest, e.g. the 1310 nm, 1490 nm and 1555 nm bands, to be combined onto the same InP substrate.

However, such PIC advantages truly change when we consider optical and electronic integration into a single integrated circuit. In the electrical domain, silicon integrated circuits have been widely adopted in all layers of the network, including physical media drivers, media access controls, and for complex network intelligence functions. In principal, monolithic integration of electronics and optics is possible, can reduce unwanted electrical parasitics, and can allow for a reduction in overall size. Further SiGe alloys allow the provisioning of multi-gigabit digital and multi-gigahertz analog circuits that extend the high speed silicon CMOS into the speed and transmission requirements of these evolving optical networks.

In the optical domain silicon optical circuits with appropriate design, introduction of additional materials such as silicon dioxide, standard electronic dopants, and SiGe alloys selectively enhances the electronic-to-optical interactions, have allowing for the creation of active devices, such as a intensity modulators and photodetectors, as well as passive devices such as optical waveguides and wavelength multiplexers. Further the micro-machining techniques for MEMS allow the inclusion of micro-mechanical elements such as shutters and mirrors into the circuits.

As such it would be particularly advantageous to provide a design approach for wavelength division multiplexers that was compatible with these industry standard processes, materials and techniques such as silicon-on-insulator (SOI) for it's ease of integration to standard silicon CMOS devices and processes. Further it would be advantageous if the design approach supported other materials, such as the previously described III-V semiconductors as well as glasses and polymers.

With monolithic optical and electronic integration the applications of the solutions show promise regarding overcoming technical difficulties in other fields where an extreme amount of data (aggregate bandwidth) is required in a very small space. More traditional applications that would benefit in the future from such optical and electronic integration would be microprocessor data busses, i.e. from microprocessor to memory or between multiple processors in a computer, and in the backplane of multiple microprocessor or server racks. Interestingly these applications would violate a widely held belief that optical communication is the best choice for long-distance transmission (hundreds of meters to hundreds of kilometers) whereas copper traces and copper cables are typically regarded as the best choice in the application space for shorter distances.

Traditionally wavelength multiplexers and demultiplexers were based upon bulk diffraction gratings. Developments in micro-optical variants continue due to the ability to provide devices without temperature control, low polarization dependence and flat passband characteristics. Such developments are detailed in recent publications including Chen et al (U.S. Pat. No. 6,563,977), Cao (U.S. Pat. No. 6,553,160) and Soskind (U.S. Pat. No. 6,735,362). However, they suffer from being discrete passive components that cannot be integrated into a monolithic device for PICs, and involve precise alignment and assembly which becomes very difficult when channel counts increase and tens of optical fibers are aligned to the grating focal plane.

As a result many attempts have been made to reduce the bulk diffraction grating down to a planar form compatible with PICs. For example Cohen et al (U.S. Pat. No. 6,657,723) discloses a planar spectrograph wherein the approach is a hybrid design employing a planar slab waveguide with a diffraction grating etched within which is assembled with micro-optic lens for coupling the multiplexed signal into the slab waveguide and a photodetector array for receiving the demultiplexed wavelength signals.

Extensions of this have integrated a launch/receipt waveguide, allowing direct interconnection with an optical fiber and propagating the multiplexed wavelength stream, and multiple passive waveguides for guiding the discrete wavelength signals into a silica-on-silicon waveguide structure along with the slab waveguide and echelle reflective grating. He et al (U.S. Pat. No. 5,937,113) being a representative example, which additionally includes a polarization compensator. Tolstikhin et al ("Monolithically Integrated Optical Channel Monitor for DWDM Transmission Systems" *Journal of Lightwave Technology*, vol. 22, no. 1, pp. 146-153, 2004) extended the monolithic integration to include an array of photodetectors by implementing the entire structure within the InP/InGaAsP semiconductor material system.

Common to these approaches is the use of the diffraction effects of a spatial grating, typically utilizing straight or concave spatial grating structures, in a reflection mode. The reflection being achieved by total internal reflection (TIR) at a deep straight wall of high index contrast formed within the integrated demultiplexer structure. The traditional fabrication of such reflective etched grating-based WDM devices generally requires that an etching of a reflective blazed grating is executed through the entire thickness of the waveguide stack structure, i.e. a deep etch of several microns to about 20 microns according to the waveguide material system and structure. This etching creates an air-waveguide interface with a high index contrast barrier for the guided mode in the structure's slab waveguide. The gratings are thus generally reflective through TIR or Fresnel reflections at this barrier. To add additional complexity to the etching, which is very deep by semiconductor processing standards, the grating surfaces must be of high verticality, low surface roughness and be replicated from the mask with sharp corners. All of these constraints further making the etching process complex, expensive and low yield.

Beguin et al (U.S. Pat. No. 6,483,964) discloses the processing issues relating to silica structures wherein the low index requires the additional deposition of coatings, commonly metallic coatings, to provide high reflectivity at the grating facets. With InP or GaAs semiconductor structures the significantly higher refractive index contrast provides possibility of removing the requirement for depositing additional coatings. However, the multiple materials typically present within the InP/InGaAsP and GaAs/AlGaAs structures present additional processing complexities as the etch chemistry employed must work on many materials including in some designs layers normally added to provide etch stops within the structure for easing manufacturing tolerances.

An alternative design approach that has had significant attention is the phased array grating, or array waveguide grating (AWG), such as disclosed by Dragone (U.S. Pat. No. 5,002,350), Dragone (U.S. Pat. No. 5,136,671), and Missey (U.S. Pat. No. 6,728,442). Unlike diffraction grating based structures an AWG is implemented in the waveguide layer as it employs a combination of planar slab waveguides, to provide free propagation zones, and channel waveguides to provide the common multiplexed waveguide and multiple discrete waveguides, together with the large number of waveguides within the central portion of the AWG that provide the phased array. As such the AWG requires etching equivalent to the other optical waveguides in the PIC. For silica this is now only the core layer, typically 5-6 microns, and for InP/InGaAsP material systems etching of a micron or so for rib loaded waveguide structures.

As such AWG structures reduce the manufacturing tolerances and complexity, although providing low polarisation dependence requires careful control of waveguide manufacturing, see for example Parhami et al (U.S. Pat. No. 6,850,670), inclusion of additional elements, see for example He et al (U.S. Pat. No. 5,937,113), as does managing the thermal characteristics of the device, see for example Dawes et al (U.S. Pat. No. 6,519,380).

Additionally researchers have employed directional couplers and ring resonators, as well as experimenting with alternative planar embodiments of alternative bulk optical designs. Amongst the later includes Davies et al (U.S. Pat. No. 5,581,639) wherein a transmissive optical grating is employed within the Raman-Nath regime working on a collimated optical signal launched from an input waveguide in combination with a parabolic mirror. Asghari presenting an alternate transmissive grating absent mirror structures in both reflective (WO 99/60433) and transmissive (WO 99/34539) formats. In Asghari this grating is achieved by etching through the core waveguide layer, whereas Davies et al advantageously specifies that the transmissive grating be formed with shallow etched structures within the upper cladding layer of the waveguide structure.

In order to address the above and other drawbacks of these WDM structures for advanced opto-electronic circuits it would be advantageous to provide a grating structure for a wavelength multiplexer/demultiplexer which is compatible with the material systems of such advanced opto-electronic circuits, such as silicon-on-insulator, standard semiconductor manufacturing processes, such as employed in CMOS, and provides for reduced manufacturing complexity, such as requiring only shallow etching, no metallisation, no verticality requirements on the etching.

SUMMARY OF THE INVENTION

In accordance with the invention there is provided an optical device for reflectively diffracting optical signals, comprising: an input port for receiving an optical signal, the optical signal comprising light having wavelengths corresponding to a predetermined set of wavelength channels; an optical medium, the optical medium comprising at least one of a plurality of waveguide layers and being characterised by a thickness, for guiding the optical signal within the optical device; a grating structure disposed at a predetermined location within the optical medium, the grating structure comprising at least one of a plurality of diffractive elements and a plurality of multilayer reflector elements; wherein, the grating structure reflectively diffracts light in dependence upon a wavelength such that light having a wavelength corresponding to a first wavelength channel is directed to a first target location of the optical medium.

Further embodiments of the invention teach a method of directing optical signals comprising: providing an optical medium, the optical medium comprising at least one of a plurality of waveguide layers and being characterised by a thickness, the optical medium for guiding optical signals; coupling a plurality of optical signals to the optical medium, each optical signal of the plurality of optical signals having a characteristic wavelength corresponding to one of a plurality of predetermined wavelength channels; providing a grating structure optically coupled to the optical medium, the grating structure comprising: a plurality of diffracting elements and at least a multilayer reflective element, such that upon interacting with the grating structure a first optical signal corresponding to a first wavelength channel is directed to a first position of the optical medium and upon interacting with the grating structure a second optical signal corresponding to a second other wavelength channel is directed to a second other position of the optical medium; and, diffracting at least one of the plurality of optical signals by reflective diffraction using the grating structure.

Further there is taught a computer readable medium having stored therein data according to a predetermined computing device format, and upon execution of the data by a suitable computing device a design procedure for providing a design of optical device is provided comprising: providing an optical medium, the optical medium comprising at least one of a plurality of waveguide layers and being characterised by a thickness, the optical medium for guiding optical signals; coupling a plurality of optical signals to the optical medium, each optical signal of the plurality of optical signals having a characteristic wavelength corresponding to one of a plurality of predetermined wavelength channels; providing a grating structure optically coupled to the optical medium, the grating structure comprising: a plurality of diffracting elements and at least a multilayer reflective element, such that upon interacting with the grating structure a first optical signal corresponding to a first wavelength channel is directed to a first position of the optical medium and upon interacting with the grating structure a second optical signal corresponding to a second other wavelength channel is directed to a second other position of the optical medium; and, diffracting at least one of the plurality of optical signals by reflective diffraction using the grating structure.

BRIEF DESCRIPTION OF THE DRAWINGS

Exemplary embodiments of the invention will now be described in conjunction with the following drawings, in which.

DETAILED DESCRIPTION OF EMBODIMENTS OF THE INVENTION

Figure 1:
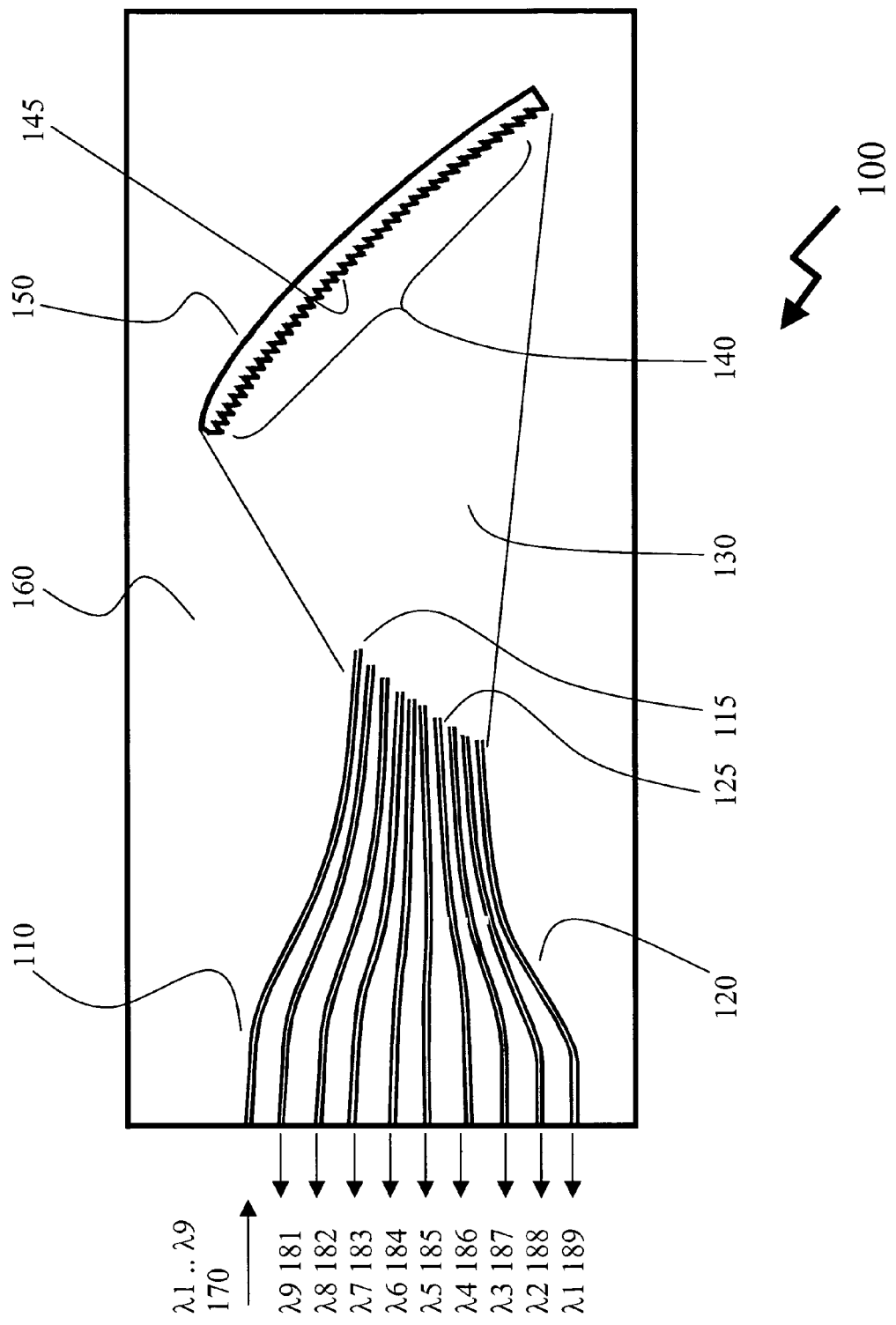
FIG. 1 is a schematic representation of an integrated optical circuit implementation of a reflective echelle grating WDM according to the prior art.

FIG. 1 is a schematic representation of an integrated optical circuit implementation of a reflective echelle grating WDM 100 according to the prior art. Shown is a silica-on-silicon (SOS) die 160, which provides the optical waveguide structure, typically, being a lower cladding of silica, a doped silica core layer, and an upper cladding layer of silica, all of which are formed on the surface of a silicon wafer.

Shown is an input optical waveguide 110, which receives a wavelength multiplexed optical stream 170. The input optical waveguide 110 then propagates the wavelength multiplexed optical stream 170 to an exit point 115 of the input optical waveguide 110. At the exit point 115 the wavelength multiplexed optical stream 170 is launched into a planar slab waveguide 130 wherein the beam expands within the plane of the wafer to substantially fill the echelle grating 140. The beam being confined within the vertical directional by the planar slab waveguide 130.

The wavelength multiplexed optical stream 170 incident the echelle grating 140 is reflected from the array of grating teeth 145, each of which provides a reflected signal with a differential phase shift relative to the grating teeth adjacent. The resulting plurality of reflected signals from the grating teeth 145 then propagate backwards through the planar slab waveguide 130 wherein the signals recombine according to their wavelength and phase shift at a focal plane such that different wavelengths focus at different horizontal positions along this focal plane. At the required wavelengths for capturing each wavelength within the wavelength multiplexed optical stream 170 there is provided an entry point 125 for a channel waveguide 120. Hence, for a device designed for operating on N wavelength channels there are N channel waveguides 120.

Each channel waveguide then propagates an optical wavelength to the edge of the silica-on-silicon die 160 wherein they exit as an array of discrete wavelengths 181 through 189. As discussed previously the echelle grating 1140 is formed by etching the series of grating teeth 145 through the entire structure of the silica-on-silicon waveguide layer. This results in a void region 150 behind the echelle grating 140, which is initially a silica-air interface. As outlined in Beguin et al (U.S. Pat. No. 6,483,964) the vertical surfaces of the grating teeth 145 are optionally coated with dielectric layers or metallic layers to enhance the reflectivity of the grating teeth 145, and thereby reducing the insertion loss of the reflective echelle grating WDM 100. Alternatively, providing the discrete optical wavelengths 181 to 189 at the SOS die 160 results in a multiplexing operation rather than the previously described demultiplexer. As a multiplexer therefore the output of the device is the wavelength multiplexed optical stream 170.

Figure 2:
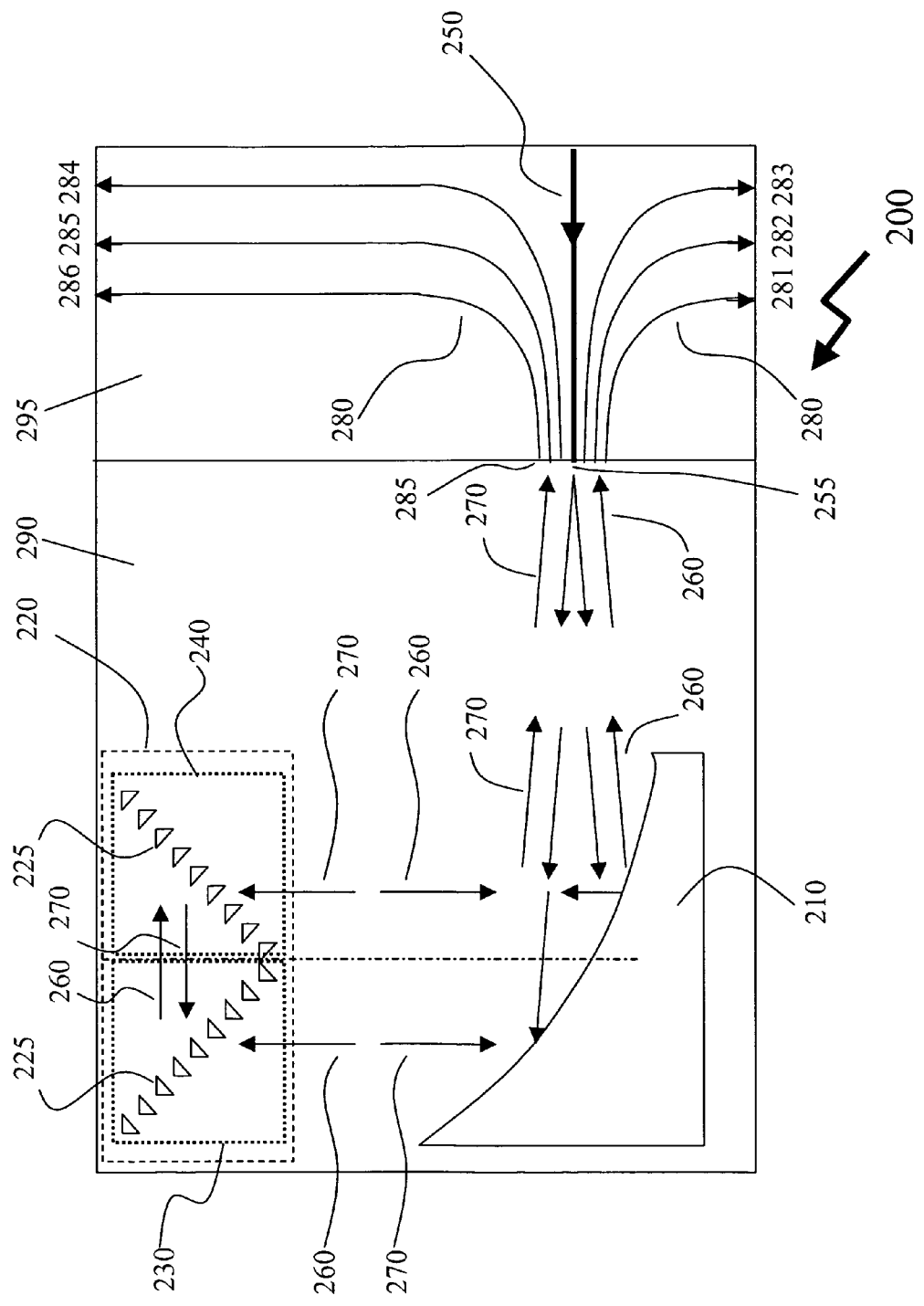
FIG. 2 is a schematic representation of an integrated optical circuit implementation of a transmissive grating based WDM 200 according to the prior art.

FIG. 2 is a schematic representation of an integrated optical circuit implementation of a transmissive grating based WDM 200 according to the prior art. Shown is an integrated optical circuit, comprising planar region 290 and channel waveguide region 295, which is typically formed using a standard waveguide material system such as SOI, SOS, polymer, and InP/InGaAsP. An input waveguide 250 receives, in this exemplary description, a wavelength multiplexed optical stream. At the exit point 255 of the input waveguide 250 the wavelength multiplexed optical stream is launched into the planar region 290, which provides only vertical confinement of the optical signals propagating within, such that the beam diverges from the exit point 255 until meeting the mirror 210 which has been etched into the planar region 290.

The mirror 210 provides a collimated reflected beam comprising a left section 260 and right section 270, which are denoted separately for the forthcoming description of the beams interaction with the transmissive grating 220. The transmissive grating 220 is formed of a left grating 230 and right grating 240, which is a mirror image of the left grating 230 essentially. Both the left grating 230 and right grating 240 being composed of a series of grating elements 225.

Now considering the left section 260 this impinges upon the left grating 230 and is firstly reflected by 90° by the series of grating elements 225 before it is reflected again by the right grating 240, again by 90°. As such the left grating 230 and right grating 240 in combination providing a retro-reflected version of the left section 260 but now with multiple phase shifted portions, which are not shown for clarity. The left section 260 is now propagating back towards the mirror 210, which reflects the left section back towards an array of output waveguides 280 distributed according to wavelength, either side of the input waveguide 250.

Now considering the right section 270 this impinges upon the right grating 240 and is firstly reflected by 90° by the series of grating elements 225 before it is reflected again by the left grating 230, again by 90°. As such the left grating 230 and right grating 240 in combination providing a retro-reflected version of the right section 270 but now with multiple phase shifted portions, which are not shown for clarity. The right section 270 is now propagating back towards the mirror 210, which reflects the left section back towards an array of output waveguides 280.

As the retro-reflected left section 270 and retro-reflected right section 260 propagate towards the array of output waveguides 280 the differential phase shift imparted from the grating 225 due to the differential path lengths introduced from the angled array of grating elements 225 causes the optical signals to recombine at different positions based upon wavelength. The recombined signals are then coupled into the array of entry points 285 of each of the channel waveguides 280. These channel waveguides 280 route signals at each supported wavelength channel to different exit points 281 through 286 of the integrated optical circuit. Equally, as described similarly in respect of FIG. 1 the provision of discrete wavelength signals at the appropriate ports 281 through 286 results in the operation of the transmissive grating based WDM 200 being reversed such that the transmissive grating based WDM 200 operates as a multiplexer rather than a demultiplexer.

Figure 3:
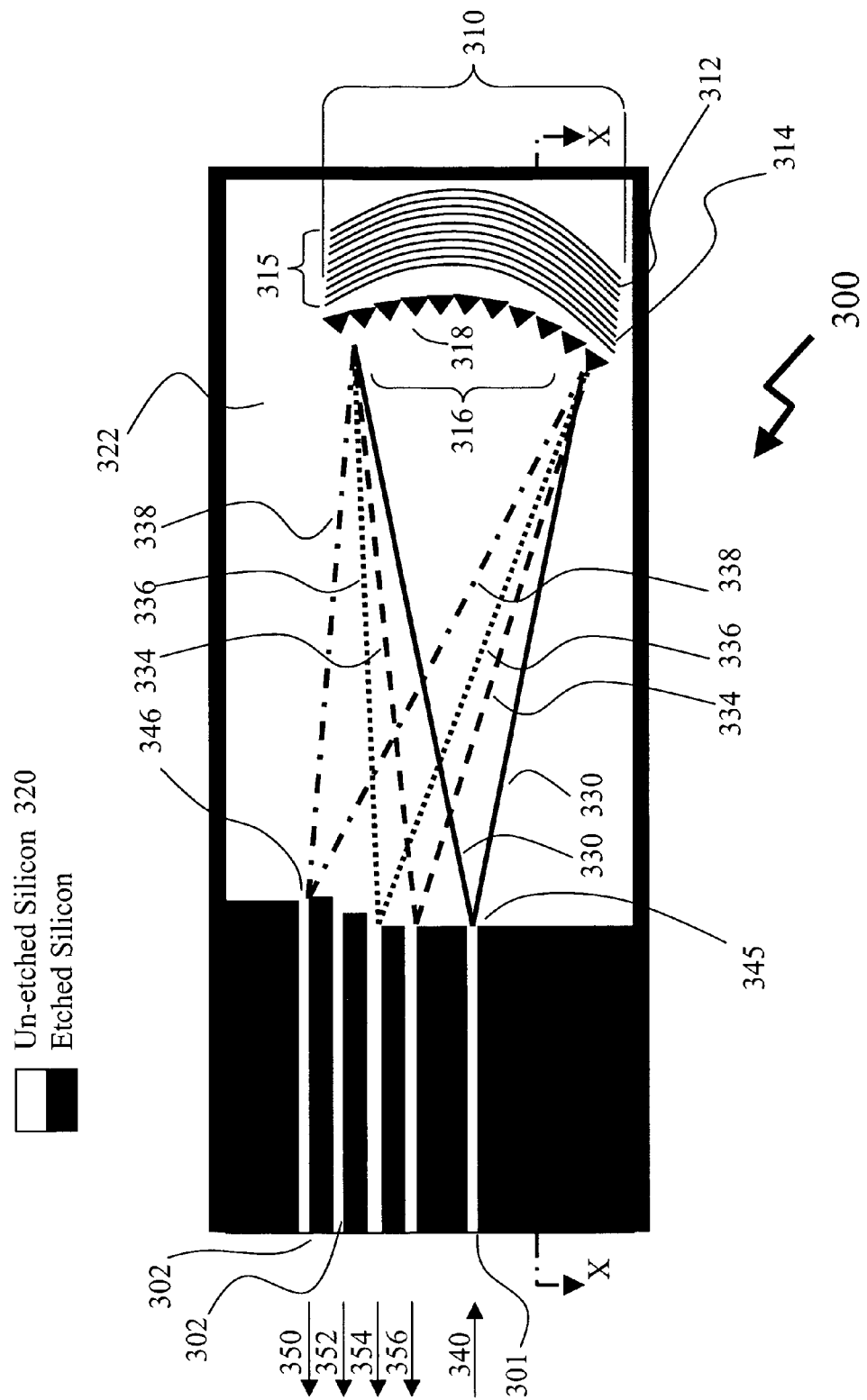
FIG. 3 is an exemplary schematic representation of a first embodiment of the invention depicting an echelette multilayer diffraction grating-based wavelength demultiplexer (MLDG-WDM).

FIG. 3 is an exemplary schematic representation of a first embodiment of the invention depicting an echelette multi-layer diffraction grating-based wavelength demultiplexer (MLDG-WDM) 300. As shown the MLDG-WDM 300 is generally comprised of a common channel waveguide 301, a plurality of wavelength channel waveguides 302, and the multi-layer diffraction grating (MLDG) 310. In common with previous descriptions operation of the MLDG-WDM 300 will be described as a demultiplexer, although the device may be reversed and be used as a multiplexer, without departing from the general scope and nature of the present disclosure. Other such applications for the MLDG-WDM 300 may include, but are not limited to, spectrometers, spectro-transducers, optical routers, reconfigurable optical add-drop multiplexers (ROADM), optical cross-connects, fixed optical add-drop multiplexers, band multiplexers, and optical interleavers. The following discussion will generally focus on the use of MLDG-WDM 300, and its alternative embodiments, as a demultiplexer for the purpose of clarity and continuity only. A person of skill in the art will readily understand that the various illustrative embodiments of MLDG-WDM 300, and other such embodiments, may be adapted to be used in any of the above or other similar applications.

As presented in respect of the exemplary embodiments the multi-layer diffraction grating structures, such as MLDG-WDM 300 are referred to in respect of being manufactured using an SOI waveguide structure. This allows presentation of a continuity of design principles and invention throughout the figures. An SOI structure being chosen due to its low cost, fabrication compatibility with traditional semiconductor industry processes and ease of integration to CMOS devices for advanced opto-electronic circuits. Alternatively the design principles may be implemented within a wide range of other waveguide materials systems, including but not limited to SOS, silicon, SiGe, GaAs/AlGaAs, InP/InGaAsP, polymers, ion-exchanged glass, ion-implanted glass, and photonic crystals without extending the scope and nature of the present disclosure.

Within the exemplary embodiments the common channel waveguide 301 and wavelength channel waveguides 302 are generally comprised of equal depth ridges in which light is guided through a waveguiding effect. In particular, common channel waveguide 301 and wavelength channel waveguides 302 comprise ridges around which the silicon is etched to a depth of roughly 50-100 nm for typical SOI implementations. In particular, the results presented herein below for MLDG-WDM structures consider etches of roughly 60 nm. These etches may be provided using conventional etching techniques such as wet etching, dry etching, and reactive ion etching, wherein the mask for such etching steps is provided by industry standard techniques such as, but not limited to, electron beam lithography and optical lithography.

The air-silicon interface surrounding the common channel waveguide 301 and wavelength channel waveguides 302 provides a high refractive index contrast adequate in generating an efficient wave guiding effect. As such, an input beam 340 coupled from an input port, such as an optical fibre, micro-optic lens assembly etc (not shown for clarity), to the common channel waveguide 301 will be guided thereby through the silicon (Si) layer 320 toward the MLDG structure 310. Likewise, output wavelength signals 334, reflectively diffracted by the MLDG 310 and directed toward the output wavelength channel waveguides 302, will be coupled thereto and guided thereby across the Si layer 320 to an output port, such as an array of optical fibres, photodetectors, micro-optic lens assembly etc (also not shown for clarity).

The MLDG 310 as shown in this exemplary embodiment is comprised of an etched transmissive diffraction grating 316 and an etched multilayer reflector 315. In particular, the etched grating is comprised of a series of substantially triangular (blazed) diffractive elements 318, etched into the Si layer 320 in an arcuate configuration at a depth of approximately 50-100 nm. The multilayer reflector 315 is comprised of series of arcuate curvilinear grooves 312, again roughly at a depth of approximately 50-100 nm, leaving a series of arcuate curvilinear ridges of Si 314. As such the grooves 312, being in this exemplary embodiment filled with air, and ridges 314 define a multilayer reflector 315 or Bragg reflector of successive high (Si) and low (air) effective refractive index layers. Again, the results presented herein below for MLGD-type structures consider multilayer grating structure etches of roughly 60 nm. These etches may again be provided using conventional etching techniques (e.g. electron beam lithography, optical lithography, etc.) in a single etching step simultaneously generating both the common channel waveguide 301, a plurality of wavelength channel waveguides 302, the transmissive diffraction grating 316, and the multilayer reflector 315. Alternatively, these structures may be fabricated in multiple steps employing different etch depths according to the requirements of the MLDG-WDM 300.

As depicted within this exemplary embodiment the region between the common channel waveguide 301, wavelength channel waveguides 302, and the transmissive diffraction grating 316 is shown as an un-etched and unaltered region 322 of the silicon layer 320. As such region 322 provides a slab waveguide structure whereby light propagating in a plane of the slab will be confined thereto between the air layer 25 and the oxide layer 22.

Within the exemplary first embodiment of FIG. 1 the MLDG 310 is shown generally configured to operate as an echelette grating. That is, the relative orientation of the common channel waveguide 301, a plurality of wavelength channel waveguides 302, the transmissive diffraction grating 316, as well as the general configuration of the multilayer reflector 315, are selected such that the transmissive diffraction grating 316 of MLDG 310 is optionally operated at a low working order (−1 in the results presented and discussed subsequently in FIGS. 4, 6, 7, 8A and 8B) with low incidence and diffraction angles. An echelle MLDG is presented and discussed further with reference to FIGS. 5, 9, 10A and 10B as in accordance with a second illustrative embodiment of the present invention. Differences between the echelette and echelle configurations will also be addressed further below.

Now referring to FIG. 1 the general operation and function of the echelette MLDG 310, and the MLDG-WDM 300 will be presented. In the illustrated embodiment, the input wavelength stream 340 comprises a plurality of multiplexed optical signals each having a different wavelength. This multiplexed input wavelength stream 340 propagates as guided modes along the common channel waveguide 301 to the common launch point 345 thereof. At that point, the two-dimensional guided mode is converted into a laterally unguided (or slab) mode, illustrated in FIG. 1 by the diverging beam lines 330, which is at this point guided within the Si layer 320, being bounded, as shown in FIG. 2, below by an oxide layer and above by an air layer. That is, once the input wavelength stream 340 enters the middle slab region 322 of the MLDG-WDM 300, the slab mode is constrained within a thickness of the top Si layer 322 and will generally scatter and disperse laterally within the slab region as it propagates toward the MLDG structure 310.

As the slab mode reaches the MLDG 310 it is first diffracted by the diffractive elements 318 of the diffraction grating 316, before being reflected by the multilayer reflector 3156, comprised of the Si ridges 314 and air grooves 312, and re-transmitted through the diffraction grating 316. It would be evident to one skilled in the art that the dual pass configuration of the transmissive diffraction grating 316 can be constructed to provide increased linear dispersion such as disclosed by Soskind (U.S. Pat. No. 6,735,362) or not as required by the application. Once reflected from the MLDG 310 the optical mode within the slab waveguide now comprises a plurality of independently converging reflectively diffracted beams or slab modes, illustrated in FIG. 1 by the paired converging lines 334, 336 and 338, propagating within the slab region 322. Each of the paired converging lines 334, 336 and 338 represents a given demultiplexed optical signal within the original wavelength multiplexed stream. These demultiplexed signals recombine according to the accumulated phase shifts and are respectively focused at the entrance point 346 of each respective wavelength channel waveguides 302. As the demultiplexed signals 350 to 356 reach the entrance point 346 of their respective output waveguide 302; they are respectively coupled thereto and guided thereby as two-dimensional guided modes. A person of skill in the art will readily understand that the MLDG 310 may equally be used as a multiplexer by inverting input and output ports to adequately multiplex a number of input wavelengths into a multiplexed output signal.

A person of skill in the art will understand that the above MLDG 310 structure and configuration is optionally modified to improve an optical response and optical characteristics thereof. For instance, as in the case of conventional integrated demultiplexers, techniques of grating apodization and aspherical curvature are optionally used to tailor the spectral profile at the exit plane, namely at the entrance point 346 of the wavelength channel waveguides 302, and to reduce grating aberrations. Both of these effects are related to the grating curvature and period distribution along the grating length and can be tailored by proper design of the multilayer grating structure 18. For example, the apodization that is used and known in a conventional etched grating demultiplexer to tailor the spectral profile to a square shape response on a plane of the output waveguides 18 is optionally directly applied to the MLDG 310 presented herein. Similarly, aberration correction can be achieved by tailoring the curvature of the MLDG 310, as commonly known and used with conventional demultiplexers. It will also be apparent to one skilled in the art that the MLDG 310 is optionally modified to incorporate additional elements such as polarization compensation, see for example the polarization compensator of He et al (U.S. Pat. No. 5,937,113), and thermal compensation, see for example Ueda (U.S. Pat. No. 6,498,878) and He et al (U.S. Pat. No. 6,169,838).

As discussed and introduced briefly above, in order to apply the above concepts and fabricate an efficient multilayer diffraction grating, as in MLDG 310, different types of multilayer gratings and configurations are optionally considered to obtain a desired reflective diffraction effect. A first option, as discussed hereinabove with reference to MLGD 10, consists of using an echelette configuration. In this configuration, the diffraction grating 316 is used at a low (−1) diffraction order and the period thereof is small. Generally, both the incidence and diffraction angles in an echelette device are about equal and small. However, an echelle MLGD is optionally considered wherein a reflective diffraction grating is used at higher order with higher incidence and diffraction angles. Such modifications are evident to one skilled in the art and implemented without departing from the scope of the invention.

Figure 4:
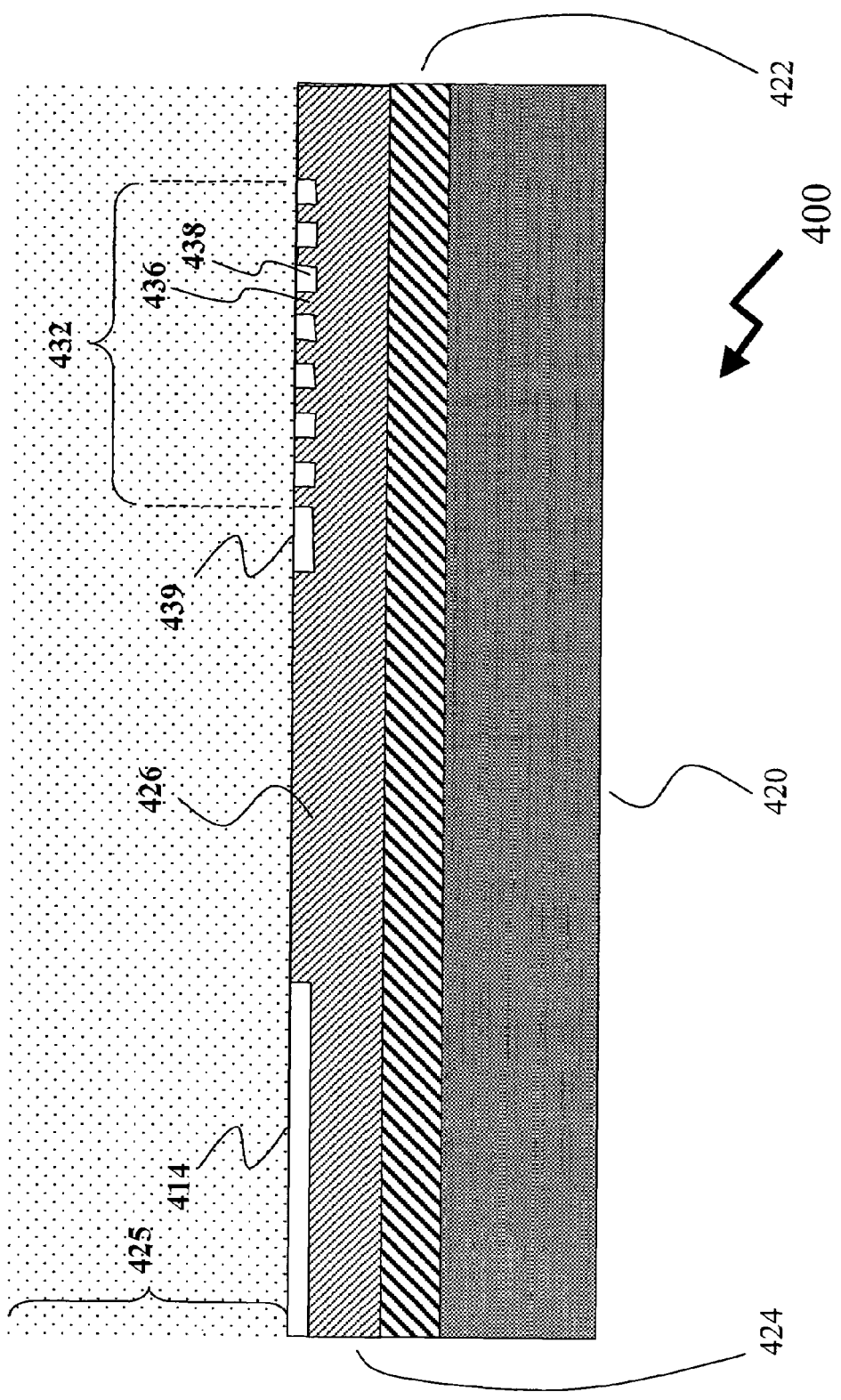
FIG. 4 is a cross-sectional view of the exemplary schematic representation of a first embodiment of the invention for the echelette MLDG-WDM FIG. 1 along section line A-A thereof.

FIG. 4 is a cross-sectional view 400 of the exemplary schematic representation of a first embodiment of the invention for the echelette MLDG-WDM FIG. 1 along section line A-A thereof. Shown is the base silicon substrate 420, a silicon oxide (silica) layer 422 and a top silicon (Si) layer 424, which is circa 200-300 nm thick. Generally, an 'air' layer 425 provides an adequate index contrast with the top Si layer 424, though other materials may be considered to provide an upper layer to the structure 400. Such materials may include, but not be limited to, those commonly deployed within CMOS processing such as silica, silicon oxynitride, silicon nitride, and spin-on glasses (SOG). As will be discussed further herein below, all of the features of the MLDG 310 may be etched directly into Si layer 424 such that all of the optical guiding, diffracting and reflecting properties of the MLDG 310 will, at least in part, be governed and/or influenced by optical interactions taking place at the silicon-oxide and/or silicon-air interfaces of the top Si layer 424 of MLDG 310. As such, the Si layer 424 provides a guiding optical medium in which multiplexed and demultiplexed optical signals may be guided and reflectively diffracted in accordance with particular design characteristics of the MLDG 310.

As shown within the cross-section are removed region 414, being the region of Si layer 424 removed such that retained material provides the common channel waveguide 301 and the wavelength channel waveguides 302 on the left hand side of the MLDG-WDM 300 of FIG. 3. The diffractive elements 318 of the transmissive diffraction grating 316 are shown as grating trench 439, whilst structure 432 represents the multilayer reflector 315. As discussed previously the structure 432 is comprised of a repetitive sequence of silicon ridges 436 and air filled grooves 438. The un-etched portion 426 between the removed region 414 and the grating trench 439 forms the slab waveguide 322 of the MLDG-WDM 300.

Figure 5:
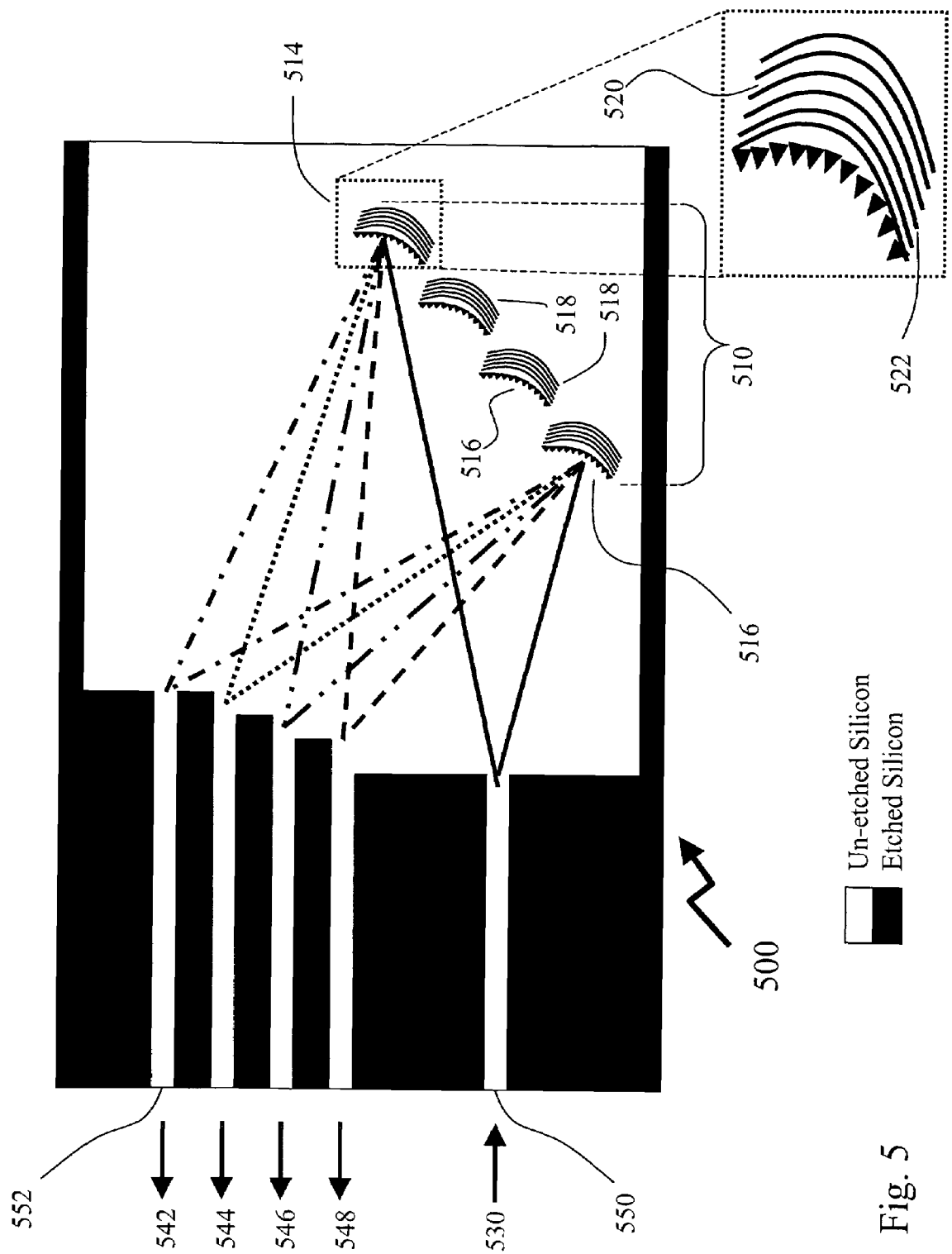
FIG. 5 is an exemplary schematic representation of a second embodiment of the invention depicting an echelle MLDG-WDM.

FIG. 5 is an exemplary schematic representation of a second embodiment of the invention depicting an echelle MLDG-WDM 500 employing an echelle multilayer grading-based wavelength demultiplexer (echelle MLDG) 510. The echelle based MLDG-WDM 500 comprises a monolithically integrated structure 502 comprised of a common wavelength waveguide 550, a plurality of wavelength channel waveguides 552, and the echelle MLDG 510.

The common wavelength waveguide 550 and plurality of wavelength channel waveguides 552 are again generally comprised of equal depth ridges (50-100 nm high) in which light is guided through a waveguiding effect. That is, an input beam 530 coupled from an input optical fibre, or similar optical coupling arrangement (not shown for clarity) is launched into the common wavelength channel waveguide 550 and is guided thereby toward the multilayer grating structure 510. Likewise, output wavelength signals 542 through 548, after being reflectively diffracted by the echelle MLDG 510 and directed toward the wavelength channel waveguides 552, are coupled thereto and guided thereby to respective output waveguides.

The echelle MLDG 510, in this exemplary second embodiment disposed in an echelle configuration so as to operate at a higher working order (−10 in the results presented herein below in FIGS. 9, 10A and 10B), is again generally comprised of an etched diffraction grating structures 514, each comprised of a series of etched diffractive elements 516 and, an etched multilayer reflector structure 518, itself being comprised of a series of etched grooves 522 and un-etched ridges 520 which provide regions of high and low effective refractive index respectfully to an optical signal propagating. In the second exemplary embodiment presented to increase an efficiency of the echelle MLDG 510, single MLDG 310 presented in FIG. 3 has been replaced with a plurality of smaller echelle MLDG 510 elements. Further, the etched grooves 522 of the plurality of multilayer reflectors 518 are considered etched concurrently within the diffractive elements 516 in subsequent results presented in FIGS. 10A and 10B.

Other features, structures and properties of the echelle MLDG-WDM 500, as well as a general function thereof, are generally as described in the first embodiment of the invention presented hereinbefore and are not reproduced here.

Figure 6:
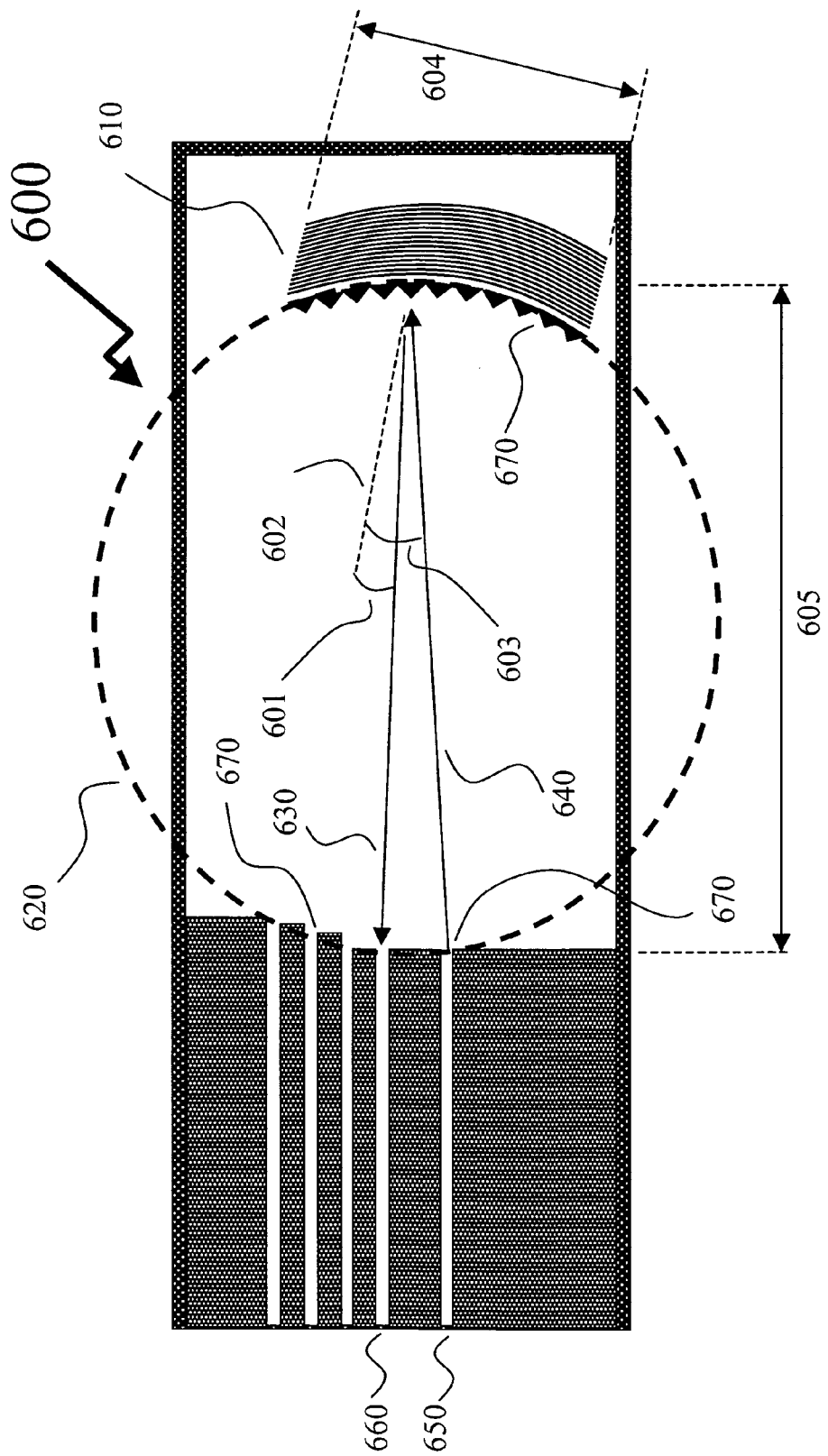
FIG. 6 is an exemplary schematic representation of the echelette MLDG-WDM of FIG. 3 depicting the various physical and optical parameters thereof used in the simulation results of the MLDG-WDM.

FIG. 6 is an exemplary schematic representation of the echelette MLDG-WDM 600 of comparable design to the echelette MLDG-WDM 300 of FIG. 3. FIG. 6 depicts the various physical and optical parameters thereof used in the simulation results of the MLDG-WDM. Schematically shown is a forward propagating beam 640, being launched from the common wavelength waveguide 650 towards the MLDG 610, and the reflected backward propagating beam 630 towards one of the wavelength channel waveguides 660. As shown the forward propagating beam 640 impinges the diffractive element 670 of the MLDG 610 at an incidence angle $\theta_i$ 603 relative to the grating normal 602. Equally the reflected backward propagating beam 630 has a diffraction angle $\theta_d$ 601 relative to the grating normal 602. The angular dispersion of the diffraction angle 601 being defined as $d\theta_d/d\lambda$. Also shown is the Rowland circle 620 on which the launch points 670 of the common wavelength waveguide 650 and wavelength channel waveguides 660 lie. Also shown is the longitudinal separation 605 of the MLDG 610 from the launch point 670 of the common wavelength waveguide 650, and the grating width 604 implemented on the MLDG-WDM 600.

To illustrate the applicability of both design configurations, being the echelette MLDG 310 of FIG. 3 and echelle MLDG 510 of FIG. 5 in the overall context of a multi-layer diffraction grating for a compact, high performance WDM within advanced opto-electronic circuits results are presented subsequently in FIGS. 8A, 8B, 10A, and 10B. Schematic details of the echelette MLDG 310 of FIG. 3 and echelle MLDG 510 of FIG. 5 being presented in FIGS. 7 and 9 respectively.

In Table 1 below, example grating properties for both echelette MLDG 310 of FIG. 3 and echelle MLDG 510 of FIG. 5 configurations are outlined, as used in the results presented subsequently in FIGS. 7 to 10. In particular, these properties where optimized to provide a desired grating resolution of 1937.5. In general, this resolution represents the ratio of a central wavelength of a multiplexed beam incident on the MLDG 310, 510, in this example 1550 nm, over the wavelength spacing, in this example 0.8 nm or 100 GHz, between adjacent optical channels within the multiplexed beam to be demultiplexed. As such the MLDG 310, 510 being a typical 1550 nm C-band WDM capable of providing 40 channels at 100 GHz (0.8 nm) spacing and representative of the vast majority of integrated optical WDM devices proposed, developed and sold commercially to date.

Using this desired grating resolution, other parameters such as the total grating width, the grating to input/output distance (longitudinal distance 605 of FIG. 6) required to provide a 10 μm lateral separation between launch points 670 of the wavelength channel waveguides 660, the free spectral range of the MLDG-WDM 300, 600, the grating period and other such parameters as illustrated in FIGS. 3, 5, and 6, are obtained for each configuration and presented in Table 1 below with respect to an SOI implementation.

TABLE 1

Simulation Parameters for Exemplary Multi-layer Diffraction Grating Designs

| Parameter | | Echelle | Echelette |
| --- | --- | --- | --- |
| Operating Wavelength (μm) | | 1.55 | 1.55 |
| Surrounding Medium Index Ratio | | 2.5589 | 2.5589 |
| MLDG Working Order | | 10 | 1 |
| Incidence Angle | (deg) | 50 | 20 |
| θi (603) | (rad) | 0.8727 | 0.3491 |
| Grating Period (μm) | | 3.9536 | 2.2659 |
| Angular Dispersion | (rad/μm) | 3.9349 | 0.4696 |
| dθ$_d$/dλ | (deg/nm) | 0.2255 | 0.0269 |
| Longitudinal Distance for 10 μm Separation (605) for 100 GHz Channel Spacing (mm) | | 3.1767 | 26.6162 |
| Free Spectral Range (nm) | | 60.57 | 236.71 |
| Total Grating Width (604) Needed (mm) | | 0.766 | 4.390 |

Figure 7:
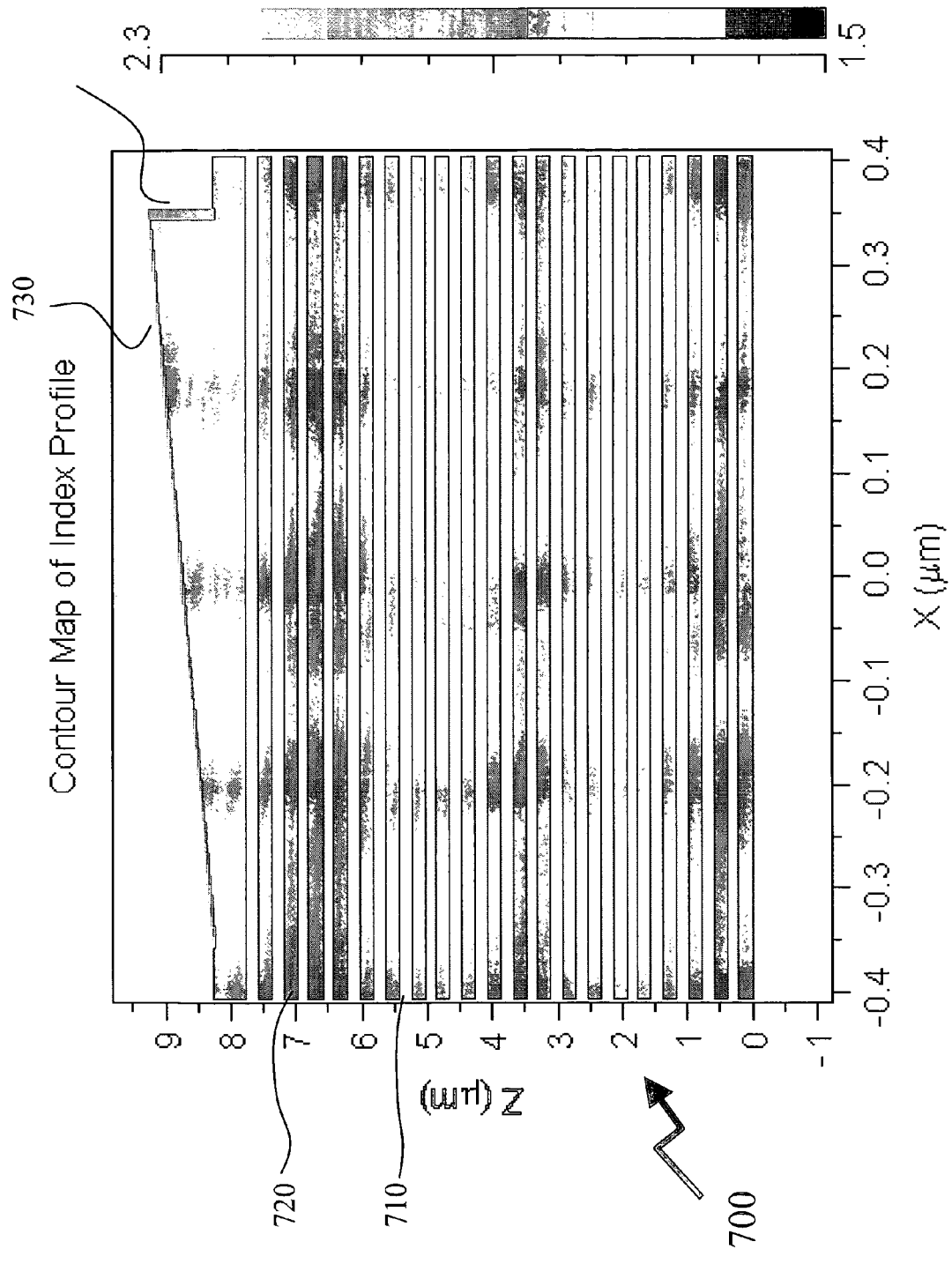
FIG. 7 is a graphical representation of the 2-dimensional (2D) effective refractive index profile for one period of the echelette MLDG-WDM according to the exemplary first embodiment of FIG. 3.

FIG. 7 is a graphical representation of the 2-dimensional (2D) effective refractive index profile for one period of the echelette MLDG-WDM according to the exemplary first embodiment of FIG. 3. In the echelette configuration, as presented hereinabove, the multi-layer diffraction grating is shown in detail as MLDG 900 and is generally comprised of two independent sets of features. The first set of features is a substantially triangular (blazed) grating profile, as in transmissive diffraction grating 316, which comprises a series of quasi-periodic diffractive elements 318 disposed in the transverse direction of the slab waveguide. By itself, the transmissive diffraction grating 316 is mostly transmissive. Referring to FIG. 7 the resulting impact of the transmissive diffraction grating 316 on the refractive index profile is shown by grating index change 730 replicating the shallow etched diffractive element 318 in the silicon layer of the device.

The second set of features is a series of pairs of high effective index regions 710 and low effective index regions 720 forming the multilayer reflector 315 of FIG. 3 and 518 of FIG. 5. The high effective index regions 720 corresponding to the Si ridges 314/520 of FIGS. 3 and 5 respectively. The low effective index regions 710 corresponding to the etched grooves 312/522 of FIGS. 3 and 5 respectively. Typically the number of high effective index regions 710 and low effective index regions 720 in the multilayer reflector 315/518 is generally selected to be between 10 and 20 pairs. The effective index of refraction as seen by the mode impinging on the multilayer reflector 315/518 varies, as stated hereinabove, depending on the thickness of the guiding Si material at that particular point in the structure. Since the multilayer reflector 315/518 is etched within the guiding top Si layer 424 of the MLDG 310/510, the thickness of the Si layer varies between etched and non-etched regions by approximately 50-100 nm. This thickness variation is taken into account when tuning the widths of the Si ridges 314/520 and air grooves 312/522 to a width corresponding to a quarter wavelength as measured within the Si layer 424, thus forming what is commonly known as a Bragg-reflector.

The width of an element within the multilayer reflector 315 is determined by the effective refractive index $n_{eff}$ of that waveguide layer structure and the wavelength of the signal as defined by equation (1) below:

$$w = \frac{\lambda_0}{4n_{eff}} \quad (1)$$

where w is the width of the element, $\lambda_0$ is the free-space wavelength of the optical signal and neff the effective refractive index of the waveguide element. More explicitly, a thick region such as the Si ridge 314 has a narrower layer width since it possesses a higher effective index while a thin region or air groove 312 has a thicker layer since it possesses a lower effective index. Typical widths for these Si ridges 314 and air grooves 312 range from 115 to 200 nm depending on grating and material properties and desired results.

In FIG. 7, a 2D effective index profile is provided for one period of an exemplary echelette multilayer grating structure 315 described above. The 2D index profile of FIG. 7 clearly illustrates a blazed diffractive element 730 and a multilayer reflector 315 comprised of high effective index Si ridges 710, having an effective index of about 2.3, and low effective index air grooves 720, effective index of about 1.7.

Figure 8A:
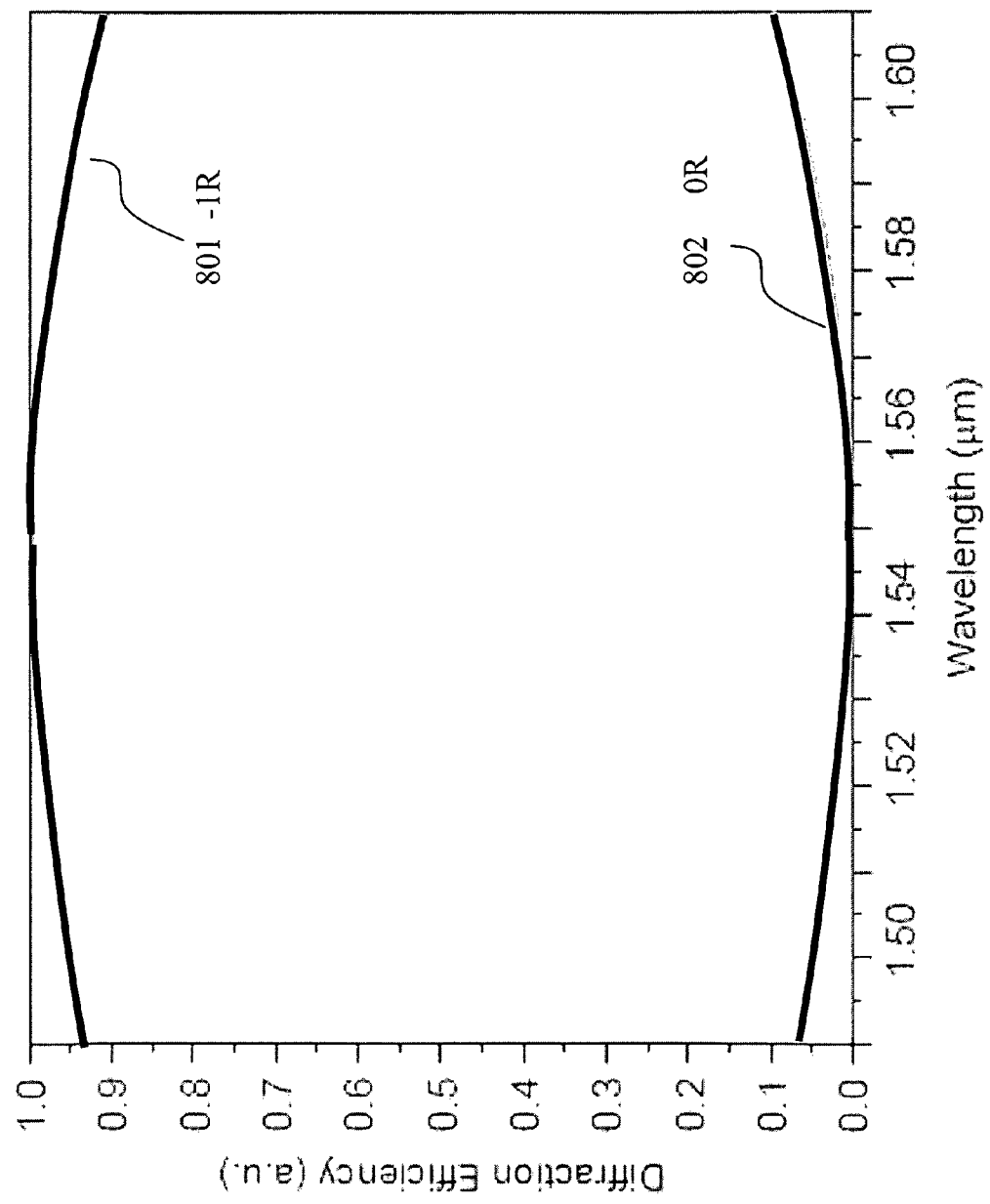
FIG. 8A is a graphical representation of the diffraction efficiency of the echelette MLDG-WDM according to the exemplary first embodiment of FIG. 1 as a function of optical wavelength.

FIG. 8A is a graphical representation of the diffraction efficiency of an exemplary echelette MLDG-WDM device according to the first embodiment of FIG. 1 as a function of optical wavelength. The analysis was performed with a rigorous coupled wave analysis (RCWA) tool, as known in the art. The predicted efficiencies of the combined diffraction grating 316 and multilayer reflector 315 are presented, assuming an infinite grating, as a function of wavelength. FIG. 8A clearly demonstrates a high efficiency for the echelette configuration at a working order of −1 for wavelengths between 1500 nm and 1600 nm. Shown are the reflected echelette signal —1R 801 and the transmitted echelette signal 0R 802.

Figure 8B:
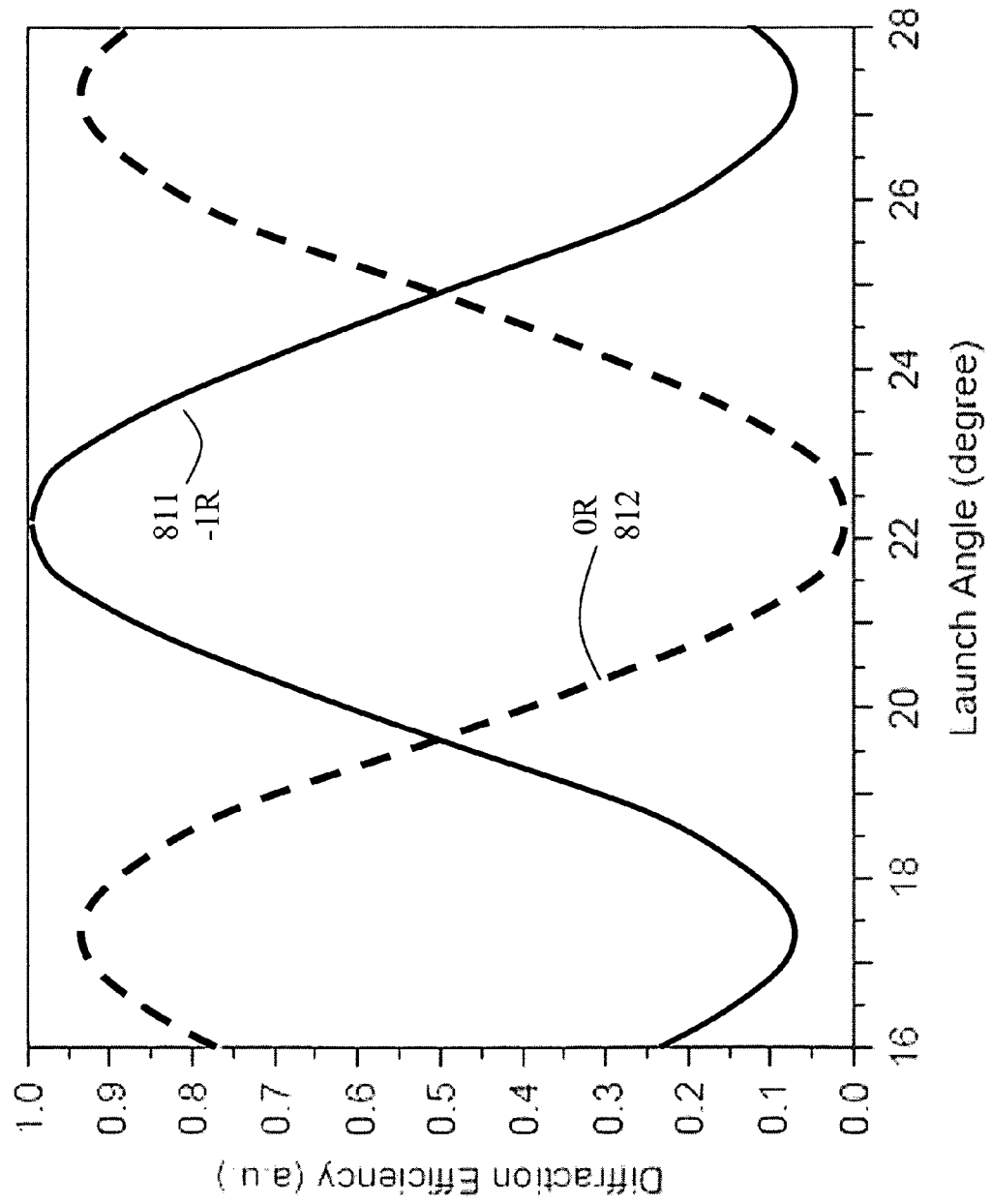
FIG. 8B is a graphical representation of the diffraction efficiency of the echelette MLDG-WDM according to the exemplary first embodiment of FIG. 3 as a function of launch angle for an optical wavelength impinging the MLDG.

FIG. 8B is a graphical representation of the diffraction efficiency of the echelette MLDG-WDM according to the exemplary device according to first embodiment of FIG. 1 as a function of launch angle for an optical wavelength impinging the MLDG. The analysis was performed with a rigorous coupled wave analysis (RCWA) tool, as known in the art. The predicted efficiencies of the combined diffraction grating 316 and multilayer reflector 315 are presented, assuming an infinite grating, as a function of incidence angle for a 1550 nm wavelength. FIG. 8B clearly demonstrates that the high efficiency for the echelette configuration at a working order of −1 for 1550 nm wavelength is achieved for launch angles between 21 and 23 degrees.

Figure 9:
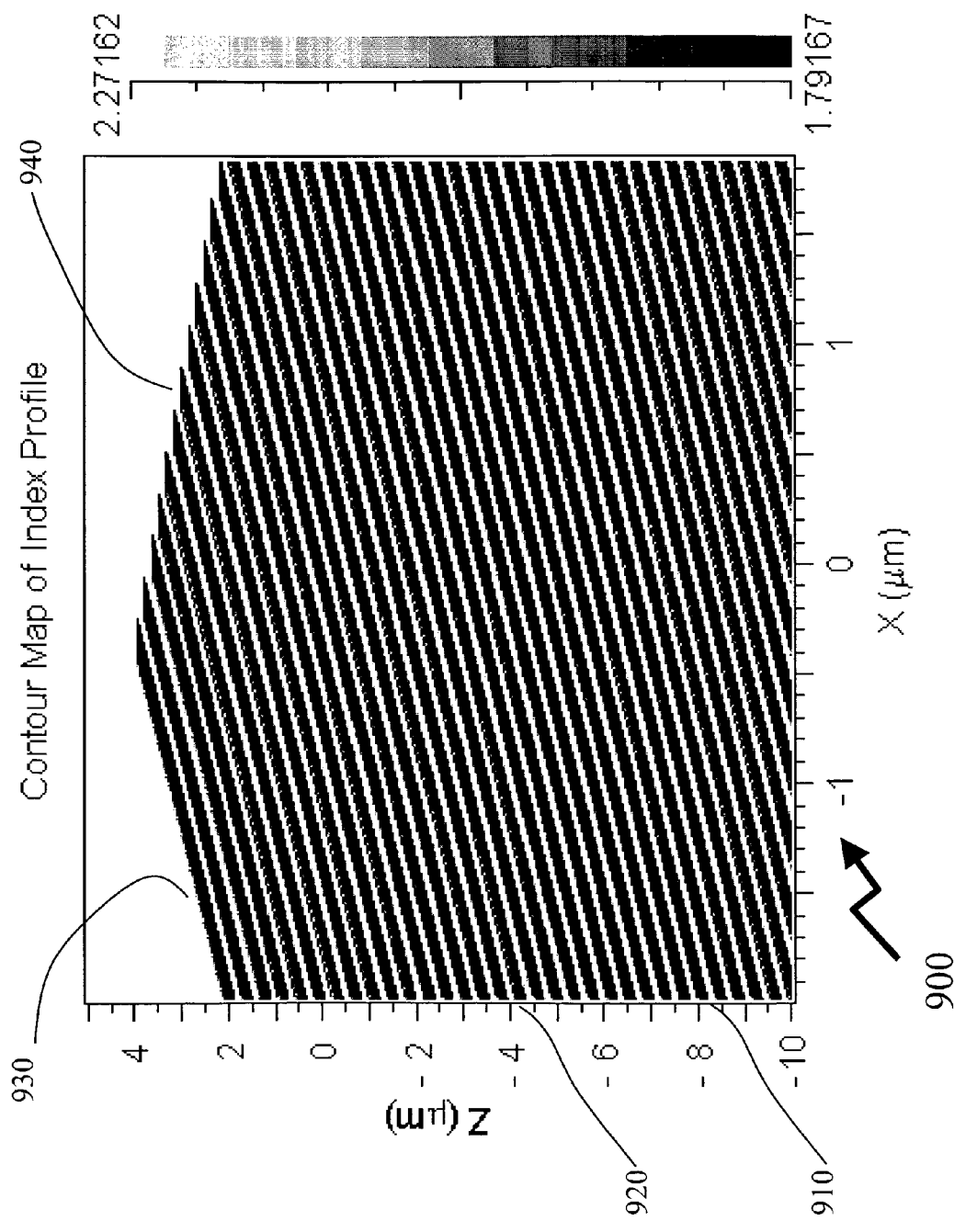
FIG. 9 is a graphical representation of the 2D effective refractive index profile for one period of the echelle MLDG-WDM according to the exemplary third embodiment.

FIG. 9 is a graphical representation of the 2D effective refractive index profile for one period of the echelle MLDG-WDM according to an exemplary third embodiment of the invention. Shown is the refractive index profile for an echelle configuration MLDG, comparable to MLDG 310 of FIG. 3 and MLDG 514 of FIG. 5 in the preceding first and second exemplary embodiments of the present invention. However, unlike the preceding multi-layer diffraction grating embodiments the first and second elements are combined into a single structure. Hence, the multi-layer reflector 518 which is formed from a series of pairs of thick, high effective index regions formed by Si ridges 520 and thin, low effective index regions formed by air grooves 522 is now embedded into the blazed grating structure 516 and comprises quasi-periodic diffractive elements disposed in a transverse direction of the slab waveguide. By itself, the triangular blazed grating structure 516 is mostly transmissive.

As a result the refractive index profile shown in FIG. 7 illustrates a blazed diffractive element with a front facet 930 and an edge facet 940, which is delineated by the terminators of air grooves, similar to those in the preceding embodiments such as air grooves 522 of FIG. 5. The blazed diffractive element therefore comprises the repetitive pairs of high effective index Si ridges 910, having an effective index of about 2.3, and low effective index air grooves 920, having an effective index of about 1.8.

Again, the width of the high effective index and low effective index regions, defined with an effective refractive index at any point by neff is given by equation (2) below:

$$w = \frac{\lambda_0}{4n_{eff}} \quad (2)$$

where w is the width of the element, $\lambda_0$ is the free-space wavelength of the optical signal.

Figure 10A:
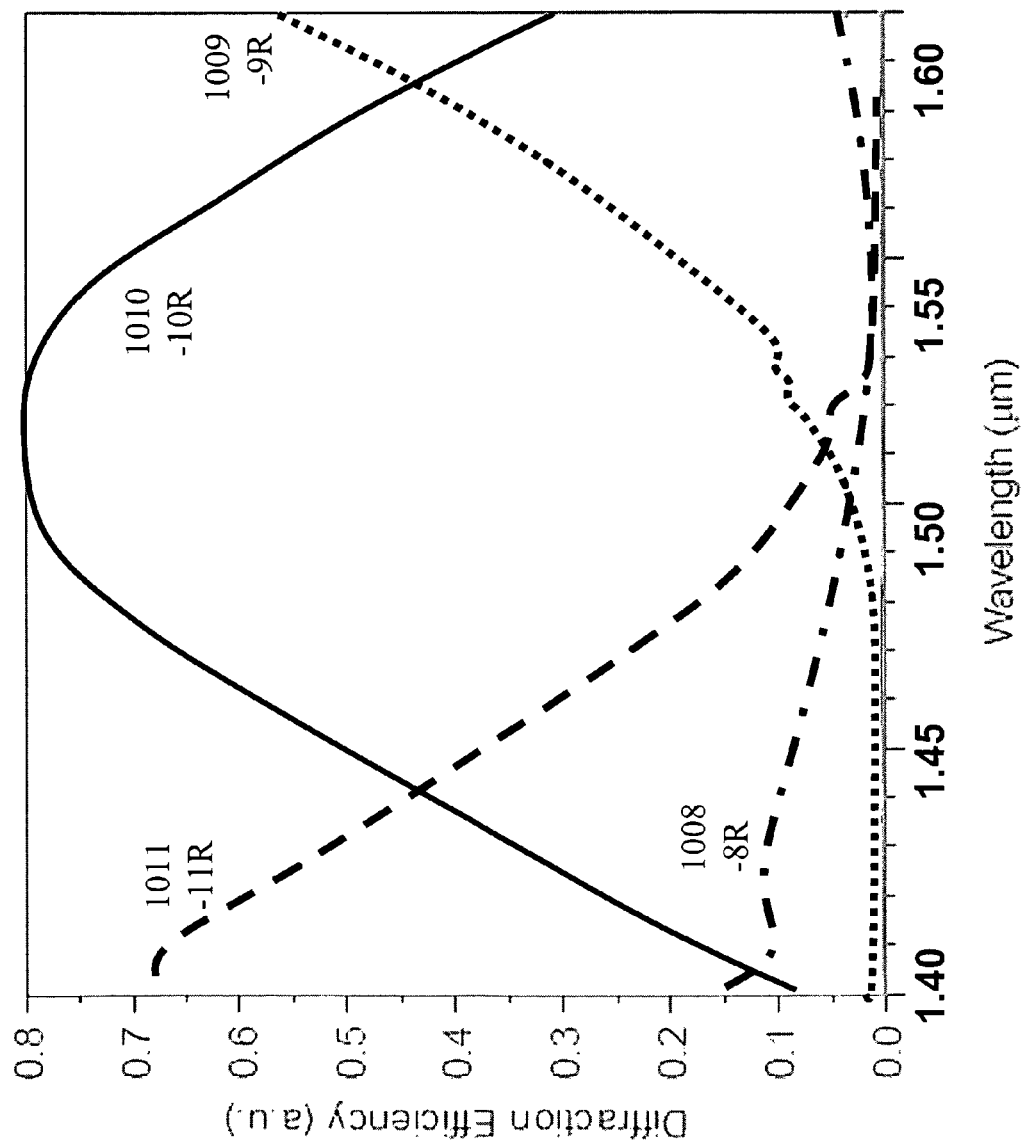
FIG. 10A is a graphical representation of the diffraction efficiency of the echelle MLDG-WDM according to the exemplary third embodiment of FIG. 9 as a function of wavelength.

Referring to FIG. 10A, a graphical representation of the diffraction efficiency of the echelle MLDG-WDM according to the exemplary third embodiment of FIG. 9 is shown as a function of optical wavelength. The simulations are made using a rigorous coupled wave analysis tool. The predicted efficiencies of the combined blazed diffractive element and multilayer reflector across a wider wavelength range 1400 nm to 1620 nm is shown, wherein high efficiency for the echelle configuration operating at a high working order, in this case −10, is peaked around 1490-1530 nm.

Figure 10B:
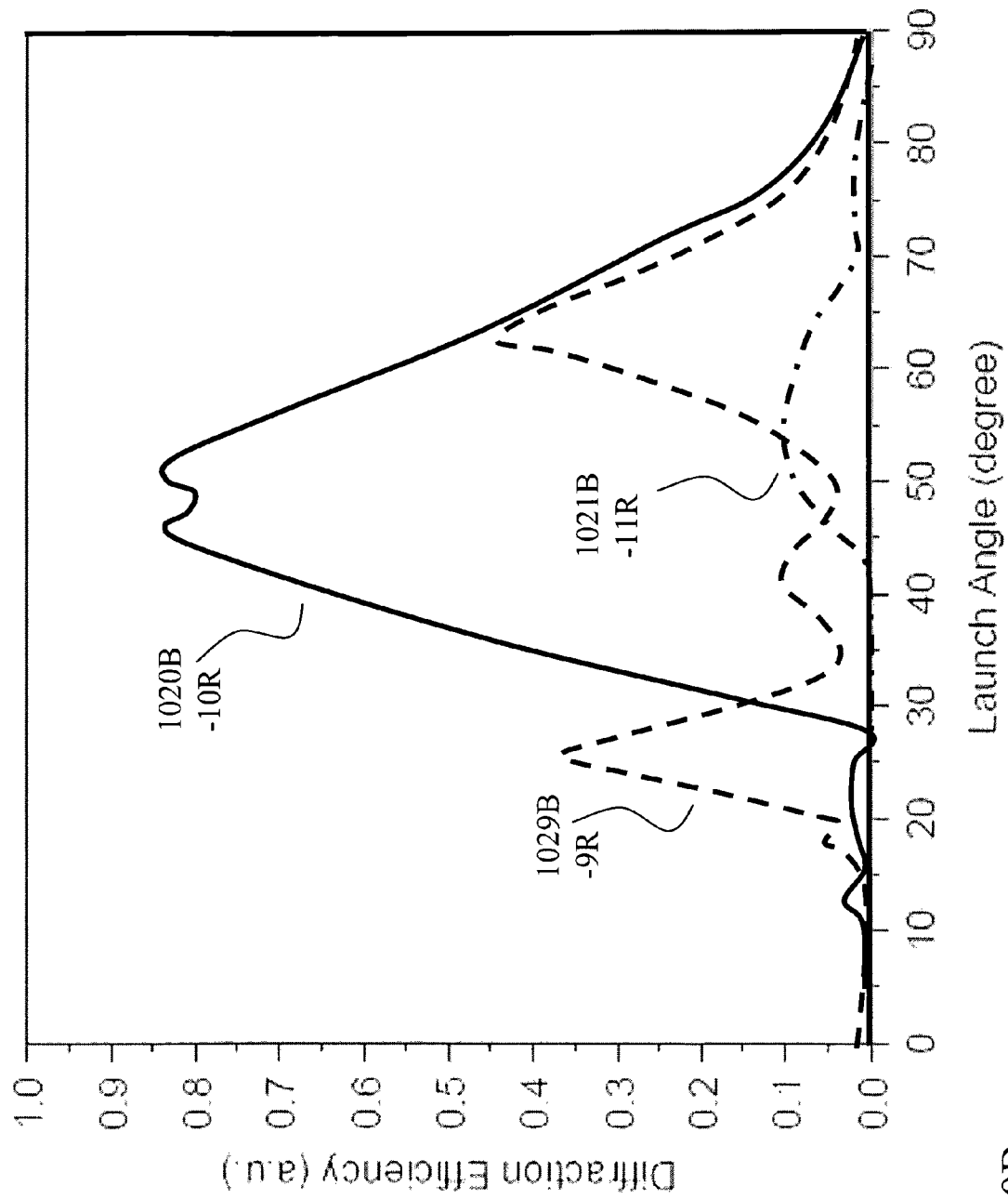
FIG. 10B is a graphical representation of the diffraction efficiency of the echelle MLDG-WDM according to the exemplary third embodiment of FIG. 9 as a function of launch angle for an optical wavelength impinging the MLDG.

FIG. 10B is a graphical representation of the diffraction efficiency of the echelle MLDG-WDM according to the exemplary third embodiment of FIG. 9 as a function of launch angle for an optical wavelength impinging the MLDG. The simulations are again made using a rigorous coupled wave analysis tool. The predicted efficiencies of the combined blazed diffractive element and multilayer reflector across a wider-angle range of 0° to 90° is shown for a nominal incident wavelength of 1500 nm. Herein high efficiency for the echelle configuration operating at a high working order, in this case −10, is peaked around 42-54 degrees.

Clearly, the above configurations of multi-layer diffraction gratings beneficially provide performance meeting telecommunication system requirements through a combination of a shallow etch diffraction grating as well as one of a shallow etch multilayer stack and a Bragg reflector. In fact, unlike known etched grating-based demultiplexers, the multi-layer diffraction grating designs according to the embodiments of the invention optionally make use of shallow etched structures extending only partially through a thickness of the guiding optical medium, i.e. Si layer 424 of SOI structure 400. As demonstrated hereinabove, etched structures of depths illustratively corresponding to anywhere from 10% to 60% of the total thickness of the guiding optical medium are considered to sufficiently provide the desired properties and optical responses in the MLGD. These depths may be varied or altered in order to customize the optical response of the MLGD for a given application. However, deeper etches are generally harder to attain, whereby the advantage of the above shallow etch structures.

Additionally the MLGD provides a number of advantages over common demultiplexers. For instance, the shallow etch depth used in these designs avoids the general fabrication constraint of known demultiplexers of producing deep, very perpendicular and very smooth diffraction grating walls. As such, MLGD structures are optionally fabricated using conventional etching techniques such as, but not limited to, electron beam lithography, optical lithography, and the like. Furthermore, no extra coating is required on the vertical walls of the etched multilayer grating structure to provide highly reflective surfaces.

Furthermore, according to an embodiment of the invention a single etch step is needed to produce all of the features of the MLGD. Both the input and output waveguides and the multilayer grating structure are optionally created in a single etch step with the same etch depth using conventional etching techniques. Beneficially the above exemplary embodiments impose no minimum angle of incidence for the light impinging upon the transmissive grating structure, unlike prior reflective grating demultiplexers based on total internal reflection (TIR) effects. The benefits of designing a structure with no minimum angle of incidence include that the structure is not restricted to the echelle grating configuration (high diffraction order) but can also be used in the echelette configuration (low diffraction order). Furthermore, a concave grating design is not required in the above as it is in traditional demultiplexers. Namely, a concave grating layout may still be used to focus the output signals from the grating in the disclosed MLGD, but the grating efficiency thereof will no longer be impacted by unwanted transmissions through the grating due to a reduction of TIR.

Additionally, since the reflective and diffractive behaviour of the multilayer grating structure arises from physically different elements of the structure, namely the diffractive elements and the multilayer reflector, the multilayer grating's spectral response characteristics are optionally tailored to suit the needs of a number of different applications. For instance, the multilayer reflectivity can be tuned to a selected profile by proper design of the layout of the multilayer stack structure and the diffraction orders of the grating structure can be made to overlap with this selected profile. The resultant overall diffraction efficiency profile is thus the product of these spectral/spatial functions. As such the multilayer grating structure is very versatile and can be tailored to a number of applications.

Figure 11:
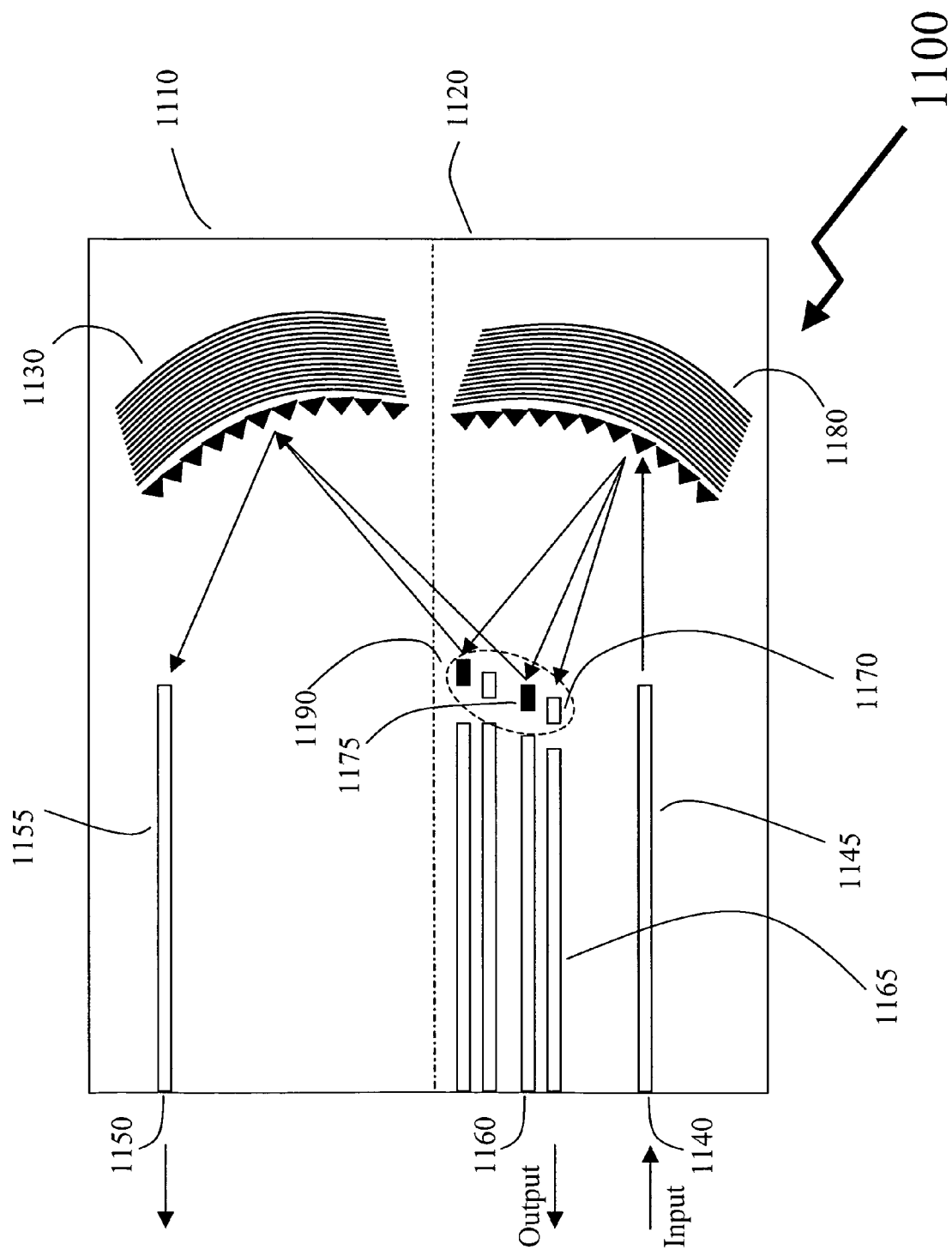
FIG. 11 is an exemplary schematic diagrammatic representation of a fourth embodiment of the invention for a reconfigurable optical add-drop multiplexer (ROADM) combining both a MLDG wavelength demultiplexer and a MLDG wavelength multiplexer with micro-mechanical mirrors (MEMS mirrors).

FIG. 11 is an exemplary schematic diagrammatic representation of a fourth embodiment of the invention for a reconfigurable optical add-drop multiplexer 1100 (ROADM) combining both a MLDG-WDM demultiplexer and a MLDG-WDM multiplexer with micro-mechanical mirrors (MEMS mirrors). Referring to FIG. 11 the ROADM 1100 is comprised of a first MLDG-WDM 1120 acting as a wavelength demultiplexer and a second MLDG-WDM 1110 acting as a wavelength demultiplexer. The first MLDG-WDM 1120 being shown comprising a common wavelength waveguide 1145, which receives a plurality of optical wavelengths as its input port 1140, a plurality of wavelength channel waveguides 1165 and a first multilayer diffraction grating 1180. Features, structures and optical properties of MLDG 1120 are substantially similar in this exemplary fourth embodiment to those of the first exemplary embodiment MLDG 310 of FIG. 3. However, in this exemplary fourth embodiment the MLDG-WDM 1120 includes additionally an array of micro-electromechanical system (MEMS) mirrors 1190 are also provided. In this exemplary embodiment the MEMS mirrors 1190 are provided at each launch point of each of the channel wavelength waveguides 1165 such that one MEMS mirror of the MEMS mirrors 1190 is associated with each channel wavelength waveguide 1165.

As are result the input optical wavelengths at input port 1140 are guided by the common wavelength waveguide 1145 and launched into the MLDG-WDM 1120 wherein the wavelengths are demultiplexed by the MLDG 1180 and propagate backwards to the array of channel wavelength waveguides 1165. However, now unlike the prior embodiments of the MLDG-WDM 300 and 500 the demultiplexed wavelengths are now either one of selectively coupled into their respective wavelength channel waveguide 1165, and redirected by a corresponding MEMS mirror within the MEMS mirrors 1190 toward the second MLDG 1130. As such the MEMS mirrors 1190 act essentially as a 1×2 switch wherein in the first state an optical signal propagates through (so-called bar state of a switch) or reflects from the MEMS mirrors 1190 to another "port" (so-called switch state of a switch) and as such the MEMS mirrors 1190 provide the ability to selectively route an individual wavelength to two different output points within the ROADM 1100. Within FIG. 11 such a "bar" state for a MEMS mirror being denoted by MEMS mirror elements 1170 and the "cross" state for a MEMS mirror being denoted by MEMS mirror elements 1175.

Now referring to the second MLDG 1110 comprises a MLDG 1130 and an output common wavelength waveguide 1155. In operation the MLDG 1130 receives the redirected demultiplexed optical signals reflected from the MEMS mirror elements 175 at the MLDG 1130 wherein they are diffracted and reflected such that now they recombine to form a multiplexed wavelength stream which is coupled into the output common wavelength waveguide 1155 and exits from the ROADM 1100 at the output port 1150 as a wavelength multiplexed stream.

The demultiplexed optical wavelengths from the MLDG 1120 impinging upon the MEMS mirror elements 170 are routed to the wavelength channel waveguides 1165 wherein they are propagated to the edge of the ROADM 1100 and exit at the demultiplexed optical ports 1160. In this manner using the ROADM 1100 one efficiently selects a number of optical signals from the multiplexed input signal 1140 for extraction and manipulation as discrete outputs 1160, while recombining those not selected into a new multiplexed output signal 1150.

It will be apparent to one of skill in the art having reviewed and understood the above and other previous examples that many applications are suitable for optical devices consistent with the embodiments of the invention. Such applications are not considered to extend the general scope and nature of the present disclosure and should be apparent to a person of skill in the art. Examples of such alternative embodiments include the provisioning of both echelette and echelle gratings into devices employing multiple gratings such as ROADM 1100, the re-multiplexing of the wavelength signals routed in the bar state of each MEMS mirror element 1170 to form a re-multiplexed stream such that the ROADM 1100 operates as a wavelength routing optical switch. It will also be evident to one of skill in the art that additional input and output ports are optionally provided to the exemplary embodiments to provide additional functionality and integration. For example, adding additional elements to form a dual input, dual output ROADM allows provisioning of a 2×2 wavelength optical cross-connect that forms a central element within a network node of a LAN.

Further, whilst the embodiment incorporates MEMS mirrors 1170 it will be evident that other MEMS structures are optionally employed without departing from the scope of the invention, for example, rotary mirrors allow the routing of a demultiplexed wavelength to 3, 4, or more MLDG elements such that wavelength routing 1×N optical elements is optionally implemented, Additionally the embodiments outlined are based upon an SOI structure 400 which supports the optical devices being manufactured as components within advanced opto-electronic circuits with CMOS electronics, hybrid SiGe photodetectors etc. As such it is evident to one skilled in the art that the channel wavelength waveguides in the embodiments optionally "terminate" in photodetectors rather than exiting the integrated optical circuits, and that such photodetectors are optionally electrically coupled to receiver circuitry integrated within the CMOS wafer that forms the Si wafer 420 of the SOI structure 400. Further, the MEMS mirror elements 1170 or other MEMS devices integrated are optionally electrically coupled to driver and control electronics implemented within the CMOS wafer forming the Si wafer 420.

Advantageously with the emergence of silicon-based photonic devices, the above designs present an advantage over traditional etched grating devices in that they are well adapted to the fabrication of ridge waveguide structures on a thin Si layer in the SOI stack such as exemplified in FIG. 4 by 420, 422, 424. In such a thin structure, the use of shallow etch depth regions which make use of Bragg-like effects are particularly useful, as it is the case in the fabrication of other types of photonic crystal structures. This structure is also suitable for integration with other silicon-based photonic components.

Numerous other embodiments may be envisaged without departing from the spirit or scope of the invention.

What is claimed is:

1. An optical device for reflectively diffracting optical signals, comprising:
   an input port for receiving an optical signal, the optical signal comprising light having wavelengths corresponding to a predetermined set of wavelength channels;
   an optical medium, the optical medium comprising at least one of a plurality of waveguide layers and being characterised by a thickness, for guiding the optical signal within the optical device;
   a grating structure disposed at a predetermined location within the optical medium, the grating structure comprising at least one of a plurality of diffractive elements and a plurality of multilayer reflector elements, each of the at least one of the plurality of diffractive elements and the plurality of multilayer reflector elements comprised of a plurality of shallow structures being at least one of on or within the optical medium and characterised by a depth corresponding to less than the thickness of the optical medium;
   wherein,
   the grating structure reflectively diffracts light in dependence upon a wavelength such that light having a wavelength corresponding to a first wavelength channel is directed to a first target location of the optical medium.

2. An optical device according to claim 1 wherein,
the optical medium comprises a planar waveguide, the planar waveguide providing one-dimensional confinement of the at least an optical signal.

3. An optical device according to claim 1 wherein,
the grating structure is provided by etching predetermined regions of the optical medium.

4. An optical device according to claim 1 wherein,
the grating structure is providing in predetermined regions of the optical medium an additional cladding layer after it's formation.

5. An optical device according to claim 1 wherein,
providing the plurality of diffractive elements by the plurality of shallow structures comprises providing a plurality of first shallow structures each characterised by a first depth corresponding to less than the thickness of the optical medium.

6. An optical device according to claim 5 wherein,
the first depth is between 1% and 60% of the thickness of the optical medium.

7. An optical device according to claim 1 wherein,
providing the plurality of multilayer reflector elements by the plurality of shallow structures comprises providing a plurality of second shallow structures each characterised by a first depth corresponding to less than the thickness of the optical medium.

8. An optical device according to claim 7 wherein,
the second depth is between 1% and 60% of the thickness of the optical medium.

9. An optical device according to claim 1 wherein,
the one of a plurality of diffractive elements and a plurality of multilayer reflector elements are comprised of a third shallow structure being at least one of on or within the optical medium, the third shallow structure being characterised by a third depth corresponding to less than the thickness of the optical medium.

10. An optical device according to claim 9 wherein,
the third depth is between 1% and 60% of the thickness of the optical medium.

11. An optical device according to claim 1 wherein,
the plurality of waveguide layers are provided on a substrate.

12. An optical device according to claim 11 wherein,
the substrate is at least one of an undoped silicon wafer, a doped silicon wafer, gallium arsenide, indium phosphide, diamond, and fused silica.

13. An optical device according to claim 11 wherein;
at least one of the plurality of waveguide layers is silicon.

14. An optical device according to claim 1 wherein,
the one of a plurality of diffractive elements and a plurality of multilayer reflector elements are provided within the optical medium as a result of a single processing sequence of a manufacturing process.

15. An optical device according to claim 1 wherein,
the plurality of diffractive elements provide a transmissive diffraction grating.

16. An optical device according to claim 1 wherein,
the plurality of multilayer reflector elements provide a mirror.

17. An optical device according to claim 1 wherein,
the plurality of diffractive elements form an echelle grating.

18. An optical device according to claim 1 wherein,
the plurality of diffractive elements form an echelette grating.

19. An optical device according to claim 1 wherein,
the plurality of multilayer reflector elements are integrally disposed within the plurality of diffractive elements.

20. An optical device according to claim 1 wherein,
the plurality of multilayer reflector elements form a Bragg reflector.

21. An optical device according to claim 1 wherein,
the plurality of diffractive elements are disposed in at least one of a first linear and first arcurate pattern.

22. An optical device according to claim 21 wherein,
the first arcurate pattern is determined by at least a first equation.

23. An optical device according to claim 1 wherein,
the plurality of multilayer reflector elements are disposed in at least one of a second linear and second arcurate pattern.

24. An optical device according to claim 22 wherein,
the second arcurate pattern is determined by at least a second equation.

25. An optical device according to claim 1 further comprising:
a plurality of channel waveguides, the plurality of channel waveguides being formed within the optical medium; wherein
each of the plurality of the channel waveguides is for guiding an optical signal.

26. An optical device according to claim 25 wherein,
the plurality of channel waveguides are for coupling optical signals with the grating structure.

27. An optical device according to claim 25 wherein,
the plurality of channel waveguides further comprise at least one of an optical switch, an optical attenuator, an optical amplifier, a photodetector, a laser diode, and a superluminescent diode.

28. An optical device according to claim 27 wherein,
the optical switch comprises a tunable mirror.

29. An optical device according to claim 27 wherein,
the optical switch selectively directing the optical signal between at least one of a channel waveguide and a second grating structure.

30. An optical device according to claim 29 wherein,
the second grating structure acting so as to multiplex optical signals.

31. An optical device according to claim 1 further comprising:
at least one of a plurality of optical elements, each optical element being at least one of a channel waveguide, an optical switch, an optical attenuator, an optical amplifier, a photodetector, a laser diode, and a superluminescent diode.

32. An optical device according to claim 31 wherein,
an optical element of the plurality of optical elements is for performing a process upon at least one optical signal having a predetermined characteristic wavelength channel of the plurality of optical signals.

33. An optical device according to claim 31 wherein,
an optical element is formed at a predetermined position within the optical device, the predetermined position being one such that a facet of the optical element is approximately positioned at a point along the focal plane of the grating structure.

34. An optical device according to claim 1 wherein;
the optical device functions as at least one of a wavelength multiplexer and a wavelength demultiplexer.

35. A method of directing optical signals comprising:
providing an optical medium, the optical medium comprising at least one of a plurality of waveguide layers and being characterised by a thickness, the optical medium for guiding optical signals;
coupling a plurality of optical signals to the optical medium, each optical signal of the plurality of optical signals having a characteristic wavelength corresponding to one of a plurality of predetermined wavelength channels;
providing a grating structure optically coupled to the optical medium, the grating structure comprising: a plurality of diffracting elements and at least a multilayer reflective element wherein each of the plurality of diffracting elements and at least the multilayer reflector element are comprised of shallow structures being at least one of on or within the optical medium and characterised by a depth corresponding to less than the thickness of the optical medium, such that upon interacting with the grating structure a first optical signal corresponding to a first wavelength channel is directed to a first position of the optical medium and upon interacting with the grating structure a second optical signal corresponding to a second other wavelength channel is directed to a second other position of the optical medium; and,
diffracting at least one of the plurality of optical signals by reflective diffraction using the grating structure.

36. A method according to claim 35 wherein,
providing the optical medium comprises providing a planar waveguide, the planar waveguide providing one-dimensional confinement of the at least an optical signal.

37. A method according to claim 35 wherein,
providing the grating structure comprises etching predetermined regions of the optical medium.

38. A method according to claim 35 wherein,
providing the grating structure comprises providing an additional cladding layer in predetermined regions of the optical medium.

39. A method according to claim 35 wherein,
providing the plurality of diffracting elements comprises providing a first shallow structure characterised by a first depth less than the thickness of the optical medium.

40. A method according to claim 39 wherein,
the first depth is between 1% and 60% of the thickness of the optical medium.

41. A method according to claim 35 wherein,
providing the multilayer reflector element comprises providing a second shallow structure characterised by a second depth less than the thickness of the optical medium.

42. A method according to claim 41 wherein,
the second depth is between 1% and 60% of the thickness of the optical medium.

43. A method according to claim 35 wherein,
providing the grating structure comprises providing a third shallow structure being at least one of on or within the optical medium, the third shallow structure being characterised by a third depth less than the thickness of the optical medium.

44. A method according to claim 43 wherein,
the third depth is between 1% and 60% of the thickness of the optical medium.

45. A method according to claim 35 wherein,
providing the plurality of waveguide layers comprises providing the layers on a single substrate.

46. A method according to claim 45 wherein,
the substrate is at least one of an undoped silicon wafer, a doped silicon wafer, gallium arsenide, indium phosphide, diamond, and fused silica.

47. A method according to claim 45 wherein;
at least one of the plurality of waveguide layers is silicon.

48. A method according to claim 35 wherein,
providing the grating structure comprises manufacturing the plurality of diffractive elements and plurality of multilayer reflector elements within the optical medium simultaneously.

49. A method according to claim 35 wherein,
providing the grating structure comprises providing a transmissive diffraction grating.

50. A method according to claim 35 wherein,
providing the grating structure comprises providing a mirror.

51. A method according to claim 35 wherein,
providing the grating structure comprises providing an echelle grating.

52. A method according to claim 35 wherein,
providing the grating structure comprises providing an echelette grating.

53. A method according to claim 35 wherein,
providing the grating structure comprises integrally disposing the plurality of multilayer reflector elements within the plurality of diffractive elements.

54. A method according to claim 35 wherein,
providing the grating structure comprises providing a Bragg reflector.

55. A method according to claim 35 wherein,
providing the grating structure comprises providing the plurality of diffractive elements in at least one of a first linear and first arcurate pattern.

56. A method according to claim 55 wherein,
providing the grating structure comprises providing first locales determined by at least a first equation.

57. A method according to claim 35 wherein,
providing the grating structure comprises providing the plurality of multilayer reflector elements in at least one of a second linear and second arcurate pattern.

58. A method according to claim 56 wherein,
providing the second arcurate pattern comprises providing second locales determined by at least a second equation.

59. A method according to claim 35 comprising:
providing at least one of a plurality of channel waveguides, the plurality of channel waveguides being formed within the optical medium; wherein
each of the plurality of the channel waveguides is for guiding an optical signal.

60. A method according to claim 59 wherein,
providing the plurality of channel waveguides comprises providing at least one of an optical switch, an optical attenuator, an optical amplifier, a photodetector, a laser diode, and a superluminescent diode.

61. A method according to claim 60 wherein,
providing the optical switch comprises providing a tunable mirror.

62. A method according to claim 60 wherein the optical switch selectively couples at least an optical signal between at least one a channel waveguide and a second grating structure.

63. A method according to claim 62 wherein,
providing the second grating structure results in providing a multiplexer for the optical signals.

64. A method according to claim 35 further comprising,
providing at least one of a plurality of optical elements, wherein providing each optical element comprises providing at least one of a channel waveguide, an optical switch, an optical attenuator, an optical amplifier, a photodetector, a laser diode, and a superluminescent diode.

65. A method according to claim 35 wherein;

providing the optical medium and the grating structure results in providing an optical device functioning as at least one of a wavelength multiplexer and a wavelength demultiplexer.

66. A computer readable medium having stored therein data according to a predetermined computing device format, and upon execution of the data by a suitable computing device a design procedure for providing a design of optical device is provided, comprising:

providing an optical medium, the optical medium comprising at least one of a plurality of waveguide layers and being characterised by a thickness, the optical medium for guiding optical signals;

coupling a plurality of optical signals to the optical medium, each optical signal of the plurality of optical signals having a characteristic wavelength corresponding to one of a plurality of predetermined wavelength channels;

providing a grating structure optically coupled to the optical medium, the grating structure comprising: a plurality of diffracting elements and at least a multilayer reflective element, wherein each of the plurality of diffracting elements and at least the multilayer reflector element are comprised of shallow structures being at least one of on or within the optical medium and characterised by a depth corresponding to less than the thickness of the optical medium, such that upon interacting with the grating structure a first optical signal corresponding to a first wavelength channel is directed to a first position of the optical medium and upon interacting with the grating structure a second optical signal corresponding to a second other wavelength channel is directed to a second other position of the optical medium; and, diffracting at least one of the plurality of optical signals by reflective diffraction using the grating structure.

67. A computer readable medium according to claim 66 further comprising, providing at least one of a plurality of channel waveguides, the plurality of channel waveguides being formed within the optical medium; wherein each of the plurality of the channel waveguides is for guiding an optical signal.

68. A computer readable medium according to claim 66 further comprising, providing at least one of a plurality of optical elements, wherein providing each optical element comprises providing at least one of a channel waveguide, an optical switch, an optical attenuator, an optical amplifier, a photodetector, a laser diode, and a superluminescent diode.

* * * * *